US010442696B2

(12) United States Patent
Shahsavari et al.

(10) Patent No.: US 10,442,696 B2
(45) Date of Patent: Oct. 15, 2019

(54) SHAPE-CONTROLLED CEMENT HYDRATE SYNTHESIS AND SELF-ASSEMBLY

(71) Applicant: WILLIAM MARSH RICE UNIVERSITY, Houston, TX (US)

(72) Inventors: Rouzbeh Shahsavari, Houston, TX (US); Sakineh Ebrahimpourmoghaddam, Houston, TX (US); Kenton Herbert Whitmire, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 0 days.

(21) Appl. No.: 15/309,279

(22) PCT Filed: May 6, 2015

(86) PCT No.: PCT/US2015/029444
§ 371 (c)(1),
(2) Date: Nov. 7, 2016

(87) PCT Pub. No.: WO2015/171745
PCT Pub. Date: Nov. 12, 2015

(65) Prior Publication Data
US 2017/0073239 A1 Mar. 16, 2017

Related U.S. Application Data

(60) Provisional application No. 61/989,461, filed on May 6, 2014.

(51) Int. Cl.
*C04B 9/04* (2006.01)
*C01B 33/24* (2006.01)
(Continued)

(52) U.S. Cl.
CPC .............. *C01B 33/24* (2013.01); *C04B 28/18* (2013.01); *C04B 28/188* (2013.01)

(58) Field of Classification Search
USPC .......................... 106/638, 672, 783, 784, 788
See application file for complete search history.

(56) References Cited

U.S. PATENT DOCUMENTS

| 3,144,346 A | 8/1964 | Dilnot |
| 6,962,623 B2 | 11/2005 | Matsuyama et al. |

(Continued)

FOREIGN PATENT DOCUMENTS

| GB | 895992 A | 5/1962 | |
| WO | WO-2013073475 A1 * | 5/2013 | ............. C01B 33/24 |
| WO | WO-2014053699 A1 | 4/2014 | |

OTHER PUBLICATIONS

Zhang et al. (Surfactant-assisted sonochemical synthesis of hollow calcium silicate hydrate (CHS) microshperes for drug delivery, Ultrasonics Sonochemistry, vol. 17, issue 5, Jun. 2010, p. 4s 789-792).*

(Continued)

*Primary Examiner* — James E McDonough
(74) *Attorney, Agent, or Firm* — Winstead PC

(57) ABSTRACT

In some embodiments, the present disclosure pertains to methods of forming calcium-silicate-hydrate particles by mixing a calcium source with a silicate source. In some embodiments, the mixing comprises sonication. In some embodiments, the mixing occurs in the presence of a surfactant and a solvent. In some embodiments, the methods of the present disclosure further comprise a step of controlling the morphology of the calcium-silicate-hydrate particles. In some embodiments, the step of controlling the morphology of calcium-silicate-hydrate particles comprises selecting a stoichiometric ratio of the calcium source over the silicate source. In some embodiments, the formed calcium-silicate- (Continued)

Figure 1A:
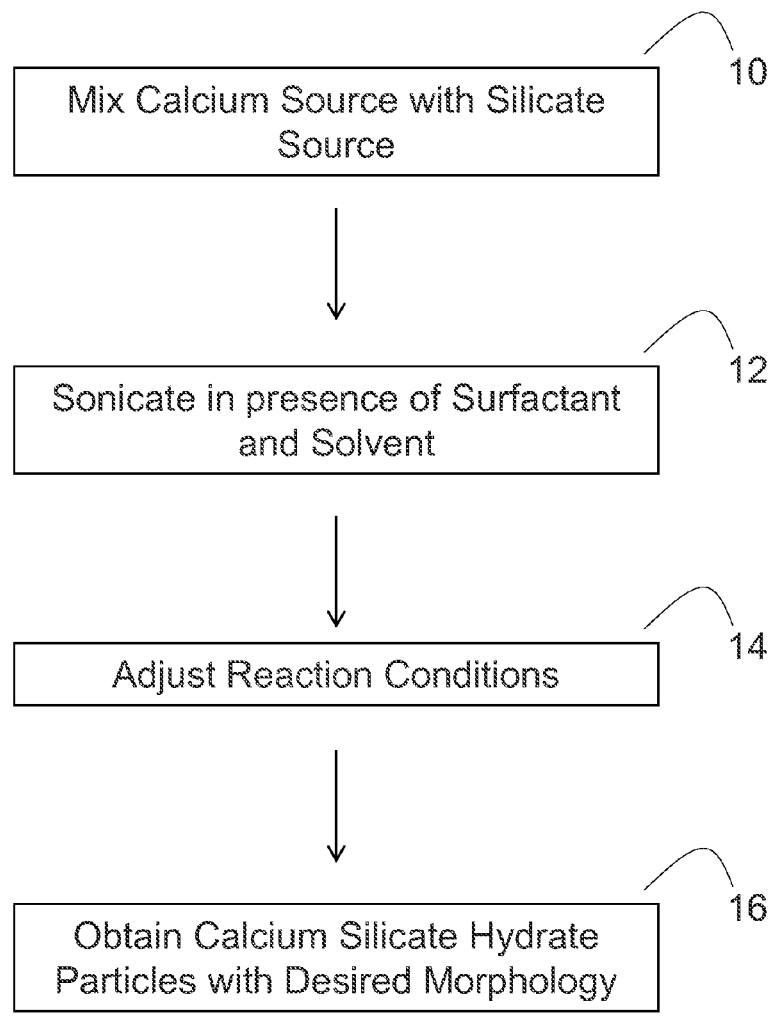

hydrate particles have cubic shapes. In some embodiments, the formed calcium-silicate-hydrate particles have rectangular shapes. In some embodiments, the formed calcium-silicate-hydrate particles are in the form of self-assembled particles of controlled shapes. Additional embodiments of the present disclosure pertain to compositions that contain the calcium silicate-hydrate particles of the present disclosure.

9 Claims, 24 Drawing Sheets

(51) Int. Cl.
    *C04B 28/18*     (2006.01)
    *C04B 7/00*     (2006.01)
    *C04B 7/34*     (2006.01)
    *C04B 28/00*     (2006.01)
    *C04B 32/00*     (2006.01)
    *C04B 16/08*     (2006.01)
    *C04B 20/00*     (2006.01)
    *C04B 38/00*     (2006.01)
    *C04B 11/00*     (2006.01)
    *C04B 28/14*     (2006.01)

(56) References Cited

U.S. PATENT DOCUMENTS

2008/0305027 A1   12/2008   Johnston et al.
2011/0120711 A1*   5/2011   James ..................... C04B 28/18
                                                                                 166/275
2011/0203486 A1   8/2011   Nicoleau et al.
2014/0287236 A1*   9/2014   Fuji ......................... C01B 33/24
                                                                                  428/402

OTHER PUBLICATIONS

Jalilvand, S. et al. Molecular Mechanistic Origin of Nanoscale Contact, Friction, and Scratch in Complex Particulate Systems, ACS APPL. Mater. Interfaces, 2015, 7 3362-3372.

Mondal, Paramita, Nanomechanical Properties of Cementitious Materials, A Dissertation Submitted to the Graduate School in Partial Fulfillment of the Requirements for the Degree Doctor of Philosophy, Field of Civil and Environmental Engineering, Northwestern University, Dec. 2008.

Pei, L.Z. et al., Short communication, A green and facile route to synthesize calcium silicate nanowires, Materials Characterization 61 (2010) 1281-1285.

Tang, J. et al. Morphology-Controlled Synthesis of Monodisperse ZnO Troughs at the Air-Water Interface under Mild Conditions, J. Phys. Chem. B 2005, 109, 22244-22249.

Flint, E. P. et al., Formation of Hydrated Calcium Silicates at Elevated Temperatures and Pressures, Research Paper RP1147, Journal of Research of the National Bureau of Standards, vol. 21, Nov. 1938, pp. 617-638.

Bogush, G.H. et al., Preparation of Monodisperse Silica Particles: Control of Size and Mass Fraction, Journal of Non-Crystalline Solids 104 (1988) 95-106, North-Holland, Amsterdam.

Manzano, H. et al., Mechanical Properties of Crystalline Calcium-Silicate-Hydrates: Comparison With Cementitious C—S—H Gels, Phys. Stat. Sol. (a) 204, No. 6, 1775-1780 (2007).

International Preliminary Report on Patentability for PCT/US2015/029444, dated Nov. 17, 2016.

International Search Report and Written Opinion for PCT/US2015/029444, dated Jul. 27, 2015.

Zhang, M et al. Surfactant-assisted sonochemical synthesis of hollow calcium silicate hydrate (CSH) microspheres for drug delivery. Ultrasonics sonochemistry. 2010; vol. 17, No. 5; pp. 789-791.

Virtudazo, RVR. et al. Simple preparation and initial characterization of semi-amorphous hollow calcium silicate hydrate nanoparticles by ammonia-hydrothermal-template techniques. Journal of nanoparticle research. 2013; vol. 15, No. 5; p. 1604.

Maeda, H et al. Hydrothermal preparation of diatomaceous earth combined with calcium silicate hydrate gels. Journal of hazardous materials. 2011; vol. 185, No. 2; pp. 858-861.

Mehrali, M et al. Facile synthesis of calcium silicate hydrate using sodium dodecyl sulfate as a surfactant assisted by ultrasonic irradiation. Ultrasonics sonochemistry. Mar. 2014; vol. 21, No. 2; pp. 735-742.

Jensen, M. M., Johannesson, B., Geiker, M. R., Stang, H., & Poulsen, S. L. (2014). A Coupled Transport and Chemical Model for Durability Predictions of Cement Based Materials. Technical University of Denmark, Department of Civil Engineering.

Kim et al., A critical analysis of calcium carbonate mesocrystals, Nat. Commun., 2014, 5, 4341.

Pellenq, RJM et al., A realistic molecular model of cement hydrates, PNAS Sep. 22, 2009 106 (38) 16102-16107.

Liu, X., Bioactivity of plasma sprayed dicalcium silicate coatings, Biomaterials 23 (2002) 963-968.

Cortes, et al., Biomimetic apatite formation on a CoCrMo alloy by using wollastonite, bioactive glass or hydroxyapatite, Journal of Materials Science 40 (2005) 3509-3515.

Lee, J.-H. et al. Bipyramid-templated synthesis of monodisperse anisotropic gold nanocrystals. *Nat. Commun.* 6:7571 doi: 10.1038/ncomms8571 (2015).

Tan, SJ, et al., Building plasmonic nanostructures with DNA, *Nature Nanotechnology,* vol. 6, pp. 268-276 (2011).

Worrell, E., et al., Carbon Dioxide Emissions From the Global Cement Industry, Annu. Rev. Energy Environ. 2001. 26:303-29.

Rodrigues, FA, et al., Cement industry: sustainability, challenges and perspectives, Environ Chem Lett (2011) 9:151-166.

Abdolhosseini Qomi, MJ, et al., Combinatorial molecular optimization of cement hydrates,*Nature Communications* vol. 5, Article No. 4960 (2014).

Sereda, P. J. and Feldman, R. F. (1963), Compacts of powdered material as porous bodies for use in sorption studies. J. Appl. Chem., 13: 150-158.

Allen, AJ, et al., Composition and density of nanoscale calcium-silicate-hydrate in cement, *Nature Materials* vol. 6, pp. 311-316 (2007).

Bharathi, S., et al., Controlled growth of single-crystalline, nanostructured dendrites and snowflakes of $\alpha$-Fe2O3: influence of the surfactant on the morphology and investigation of morphology dependent magnetic properties, CrystEngComm, 2010, 12, 373-382.

Alizadeh, R et al., C—S—H/polyaniline nanocomposites prepared by in situ polymerization, J Mater Sci (2011) 46:460-467.

Zeng, Q et al., Determination of cement hydration and pozzolanic reaction extents for fly-ash cement pastes, Construction and Building Materials 27 (2012) 560-569.

Rog, G et al., Determination of the standard Gibbs free energies of formation of the calcium silicates by e.m.f. measurements, J. Chem. Thermodynamics 1983, 15, 107-110.

Shahsavari, R, et al., Edge dislocations in dicalcium silicates: Experimental observations and atomistic analysis, Cement and Concrete Research 90 (2016) 80-88.

El-Sheikh, S.M., et al., Effects of cationic surfactant during the precipitation of calcium carbonate nano-particles on their size, morphology, and other characteristics, Colloids and Surfaces A: Physicochem. Eng. Aspects 422 (2013) 44- 49.

Pardal, et al., Experimental study of Si—Al substitution in calcium-silicate-hydrate (C—S—H) prepared under equilibrium conditions, Cement and Concrete Research 39 (2009) 637-643.

Mehrali, M, et al., Facile synthesis of calcium silicate hydrate using sodium dodecyl sulfate as a surfactant assisted by ultrasonic irradiation, Ultrasonics Sonochemistry 21 (2014) 735-742.

Feldman, R.F., et al., Factors affecting young's modulus—Porosity relation of hydrated portland cement compacts, Cement and Concrete Research, vol. 2, Issue 4, Jul. 1972, pp. 375-386.

Birchali et al., Flexural strength and porosity of cements, Nature, 1981, 289, 388-390.

(56) References Cited

OTHER PUBLICATIONS

Beaudoin, J.J., et al., Formation and characterization of calcium silicate hydrate-hexadecyltrimethylammonium nanostructure, J. Mater. Res., vol. 23, No. 10, Oct. 2008.
Wu, J, et al., Hierachically Nanostructured Mesoporous Spheres of Calcium Silicate Hydrate: Surfactant-Free Sonochemical Synthesis and Drug-Delivery System with Ultrahigh Drug-Loading Capacity, Adv. Mater. 2010, 22, 749-753.
Alizadeh, R., Hydration of tricalcium silicate in the presence of synthetic calcium-silicate-hydrate, J. Mater. Chem., 2009, 19, 7937-7946.
Shaw, S, et al., Hydrothermal formation of the calcium silicate hydrates, tobermorite ($Ca_5Si_6O_{16}(OH)_2 \cdot 4H_2O$) and xonotlite ($Ca_6Si_6O_{17}(OH)_2$): an in situ synchrotron study, Chemical Geology 167 (2000) 129-140.
Siriphannon, P., Kameshima, Y., Yasumori, A., Okada, K. and Hayashi, S. (2000), Influence of preparation conditions on the microstructure and bioactivity of $\alpha$-$CaSiO_3$ ceramics: Formation of hydroxyapatite in simulated body fluid. J. Biomed. Mater. Res., 52: 30-39.
Ould-Ely, T., et al., Manganese(II) Oxide Nanohexapods: Insight into Controlling the Form of Nanocrystals, Chem. Mater. 2006, 18, 1821-1829.
Alizadeh, R., et al., Mechanical properties of calcium silicate hydrates, Materials and Structures (2011) 44:13-28.
Ioannidou, K et al., Mesoscale texture of cement hydrates, Proceedings of the National Academy of Sciences Feb. 2016, 113 (8) 2029-2034; DOI: 10.1073/pnas.1520487113.
Wu, J., Microwave-assisted preparation of $Ca_6Si_6O_{17}(OH)_2$ and $\beta$-$CaSiO_3$ nanobelts, Materials Research Bulletin 45 (2010) 509-512.
Balazs, et al., Nanoparticle Polymer Composites: Where Two Small Worlds Meet, Science, Nov. 17, 2006 : 1107-1110.
Rusakova, I, et al., Nanoparticle Shape Conservation in the Conversion of MnO Nanocrosses into $Mn_3O_4$, Chem. Mater. 2007, 19, 1369-1375.
Zhou, Q, Nanoparticle-based crystal growth via multistep selfassembly, CrystEngComm, 2013, 15, 5114.
Skinner, L.B., et al., Nanostructure of Calcium Silicate Hydrates in Cements, PRL 104, 195502 (2010).
Ma, Ming-Yan, et al., Nanostructured porous hollow ellipsoidal capsules of hydroxyapatite and calcium silicate: preparation and application in drug delivery, J. Mater. Chem., 2008, 18, 2722-2727.
Bile, EG, et al., New ammonium surfactant-stabilized rhodium(0) colloidal suspensions: Influence of novel counter-anions on physicochemical and catalytic properties, Dalton Trans., 2011, 40, 6524.
Huang, X., et al., Novel hydrothermal synthesis of tobermorite fibers using Ca(II)-EDTA complexprecursor, Journal of the European Ceramic Society 23 (2003) 123-126.
Sonobe, Y, et al., Polymorphism, Size and Shape Control of Calcium Carbonate Crystals in the Presence of a Polyelectrolyte, Chem. Eng. Technol. 2015, 38, No. 6, 1053-1058.
Nie, Z., et al., Properties and emerging applications of self-assembled structures made from inorganic nanoparticles, Nat. Nanotechno, 2010, 5, 15-25.
Donatello, S., et al., Recent developments in macro-defect-free (MDF) cements, Construction and Building Materials 23 (2009) 1761-1767.
Shahsavari, R., et al., Screw Dislocations in Complex, Low Symmetry Oxides: Core Structures, Energetics, and Impact on Crystal Growth, ACS Appl. Mater. Interfaces 2015, 7, 2223-2234.

Jana, NR, et al., Seed-Mediated Growth Approach for Shape-Controlled Synthesis of Spheroidal and Rod-like Gold Nanoparticles Using a Surfactant Template, Adv. Mater. 2001, 13, No. 18, Sep. 14.
Mann, Stephen, Self-assembly and transformation of hybrid nano-objects and nanostructures under equilibrium and non-equilibrium conditions, Nat. Mater., 2009, 8 781-792.
Sun, Y., et al., Shape-Controlled Synthesis of Gold and Silver Nanoparticles, Science, 2002, 298, 2176-2179.
Xia, Y, et al., Shape-Controlled Synthesis of Metal Nanocrystals: Simple Chemistry Meets Complex Physics?, Angew Chem Int Ed Engl. 2009 ; 48(1): 60-103. doi:10.1002/anie.200802248.
Xiong, Y., et al., Shape-Controlled Synthesis of Metal Nanostructures: The Case of Palladium, Adv. Mater. 2007, 19, 3385-3391.
Chen, JJ, et al., Solubility and structure of calcium silicate hydrate, Cement and Concrete Research 34 (2004) 1499-1519.
Meyers, MA, et al., Structural Biological Materials: Critical Mechanics-Materials Connections, Science, 2013, 339, 773-779.
Yu, P., et al., Structure of Calcium Silicate Hydrate (C—S—H): Near-, Mid-, and Far-Infrared Spectroscopy, J. Am. Ceram. Soc., 82 [3] 742-48 (1999).
Bergstom, M, et al., Structure of pure SDS and DTAB micelles in brine determined by small-angle neutron scattering (SANS), Phys. Chem. Chem. Phys., 1999, 1, 4437-4446.
Zhang, et al., Surfactant-assisted sonochemical synthesis of hollow calcium silicate hydrate (CSH) microspheres for drug delivery, Ultrasonics Sonochemistry 17 (2010) 789-792.
Xiao, J., et al., Surfactant-assisted, shape-controlled synthesis of gold nanocrystals, Nanoscale, 2011, 3, 1383.
Sakhavand, N., et al., Synergistic Behavior of Tubes, Junctions, and Sheets Imparts Mechano-Mutable Functionality in 3D Porous Boron Nitride Nanostructures, J. Phys. Chem. C 2014, 118, 22730-22738.
Rodriguez-Lorenzo, LM, et al., Synthesis, characterization, bioactivity and biocompatibility of nanostructured materials based on the wollastonite-poly(ethylmethacrylate-co-vinylpyrrolidone) system, J Biomed Mater Res A. Jan. 2009;88(1):53-64. doi: 10.1002/jbm.a.31867.
Zheng, JY, et al., Synthesis of mesoporous titanium dioxide materials by using a mixture of organic compounds as a non-surfactant template, J. Mater. Chem., 2001, 11, 3367-3372.
Boyjoo, Y., et al., Synthesis of micro and nano-sized calcium carbonate particles and their applications, J. Mater. Chem. A, 2014, 2, 14270.
Lin, K et al., Synthesis of wollastonite nanowires via hydrothermal microemulsion methods, Materials Letters 60 (2006) 3007-3010.
Ioannidou, K., et al., The crucial effect of early-stage gelation on the mechanical properties of cement hydrates,Nat. Commun. , 2016, 7, 12106.
Nonat, Andre, The structure and stoichiometry of C—S—H, Cement and Concrete Research 34 (2004) 1521-1528.
Bonnaud, P.A., et al., Thermodynamics of Water Confined in Porous Calcium-Silicate-Hydrates, Langmuir 2012, 28, 11422-11432.
Sakhavand, N., et al., Toughness Governs the Rupture of the Interfacial H-Bond Assemblies at a Critical Length Scale in Hybrid Materials, Langmuir 2013, 29, 8154-8163.
Auffan, M., et al., Towards a definition of inorganic nanoparticles from an environmental, health and safety perspective, Nat. Nanotechnol., 2009, 4, 634-641.
Wu, J., et al., Ultrathin Calcium Silicate Hydrate Nanosheets with Large Specific Surface Areas: Synthesis, Crystallization, Layered Self-Assembly and Applications as Excellent Adsorbents for Drug, Protein, and Metal Ions, Small 2013, 9, No. 17, 2911-2925.
Foley, E.M. et al., Synthesis and nano-mechanical characterization of calcium-silicate-hydrate (C—S—H) made with 1.5 CaO/SiO2 mixture, Cement and Concrete Research 42 (2012) 1225-1232.

* cited by examiner

US 10,442,696 B2

SHAPE-CONTROLLED CEMENT HYDRATE SYNTHESIS AND SELF-ASSEMBLY

CROSS-REFERENCE TO RELATED APPLICATIONS

This application claims priority to U.S. Provisional Patent Application No. 61/989,461, filed on May 6, 2014. The entirety of the aforementioned application is incorporated herein by reference.

STATEMENT REGARDING FEDERALLY SPONSORED RESEARCH

This invention was made with government support under Grant No. 1346506, awarded by the National Science Foundation. The government has certain rights in the invention.

BACKGROUND

Current methods of making cementitious materials have numerous limitations, including the inability to control the shape of the formed materials. The present disclosure addresses such limitations.

SUMMARY

In some embodiments, the present disclosure pertains to a method of preparing calcium silicate hydrate (CSH) particles by using a controlled surfactant-assisted sonochemical method. In some embodiments, the present disclosure pertains to methods of forming CSH particles by mixing a calcium source with a silicate source to result in the formation of the calcium-silicate-hydrate particles. In some embodiments, the mixing comprises sonication. In some embodiments, the mixing occurs in the presence of a surfactant and a solvent.

In some embodiments, the methods of the present disclosure further comprise a step of controlling the morphology of the calcium-silicate-hydrate particles. In some embodiments, the controlling comprises at least one of controlling the sonication time, controlling the sonication temperature, controlling the sonication amplitude, selecting the solvent, selecting the solvent volume, selecting the calcium source, selecting a concentration of the calcium source, selecting the silicate source, selecting a concentration of the silicate source, selecting the surfactant, selecting a concentration of the surfactant, selecting a stoichiometric ratio of the calcium source over the silicate source, controlling the rate of adding a calcium source or a silicate source to a reaction mixture, adjusting a gas flow during the reaction, adjusting the reaction pH, and combinations thereof.

In some embodiments, the step of controlling the morphology of calcium-silicate-hydrate particles comprises selecting a stoichiometric ratio of the calcium source over the silicate source. In some embodiments, the stoichiometric ratio of the calcium source over the silicate source ranges from about 0.5 to about 3. In some embodiments, the stoichiometric ratio of the calcium source over the silicate source ranges from about 1.2 to about 1.8. In some embodiments, the stoichiometric ratio of the calcium source over the silicate source is at least one of less than 1.0, 1.0, between 1.0 and 1.5, 1.5, between 1.5 and 2, 2.0, or greater than 2.0.

In some embodiments, the formed calcium-silicate-hydrate particles comprise cubic shapes, rectangular shapes, spherical shapes, rod-like shapes, rhombohedra shapes, core-shell-like shapes, dendritic shapes, agglomerated dendritic shapes, irregular shapes, and combinations thereof. In some embodiments, the formed calcium-silicate-hydrate particles have cubic shapes. In some embodiments, the formed calcium-silicate-hydrate particles have rod-like shapes. In some embodiments, the formed calcium-silicate-hydrate particles have rectangular shapes, such as rectangular prisms.

In some embodiments, the formed calcium-silicate-hydrate particles are in the form of nanoparticles, microparticles, and combinations thereof. In some embodiments, the formed calcium-silicate-hydrate particles are in the form of self-assembled particles. In some embodiments, the self-assembled particles are non-porous.

In some embodiments, the formed calcium-silicate-hydrate particles are in semi-crystalline form. In some embodiments, the formed calcium-silicate-hydrate particles include semi-crystalline cubes.

Additional embodiments of the present disclosure pertain to the calcium-silicate hydrate particles formed in accordance with the methods of the present disclosure. Further embodiments of the present disclosure pertain to compositions that contain the calcium silicate-hydrate particles of the present disclosure.

DRAWINGS

Figure 1B:
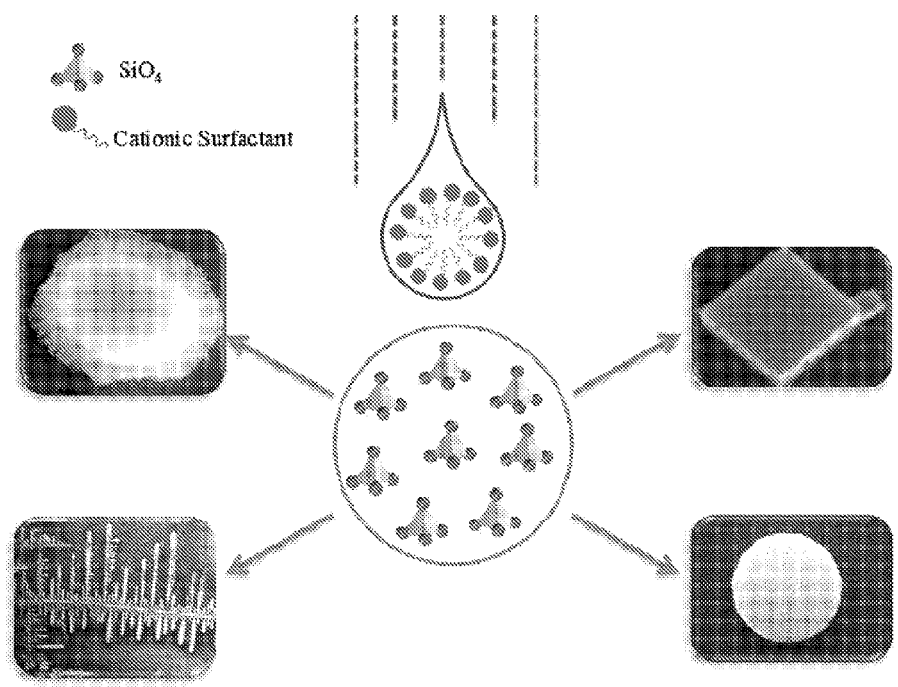

FIG. 1 provides a scheme (FIG. 1A) and an illustration (FIG. 1B) of methods of forming calcium silicate hydrate (CSH) particles.

Figure 2A:
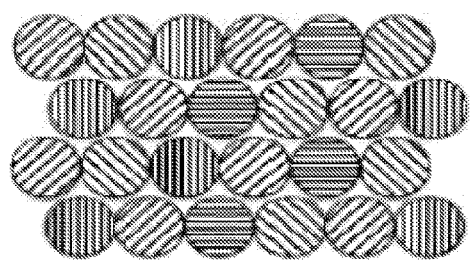
Figure 2B:
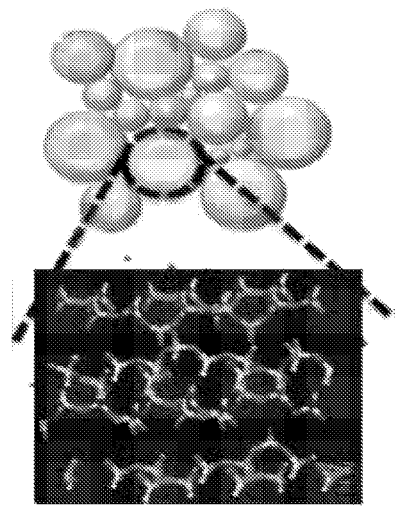
Figure 2C:
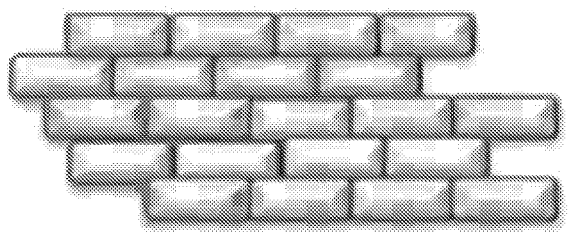
Figure 2C:
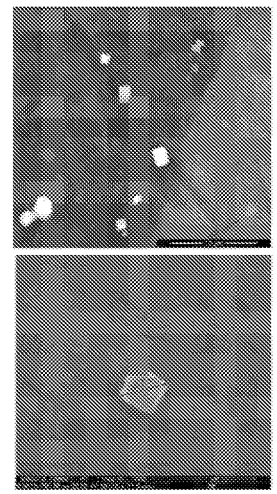

FIG. 2 provides a comparative illustration of the formation of CSH particles by prior art methods (FIGS. 2A-B) and the methods of the present disclosure (FIG. 2C). Images on the right panel of FIG. 2C represent typical CSH particles formed by the methods of the present disclosure.

Figure 3:
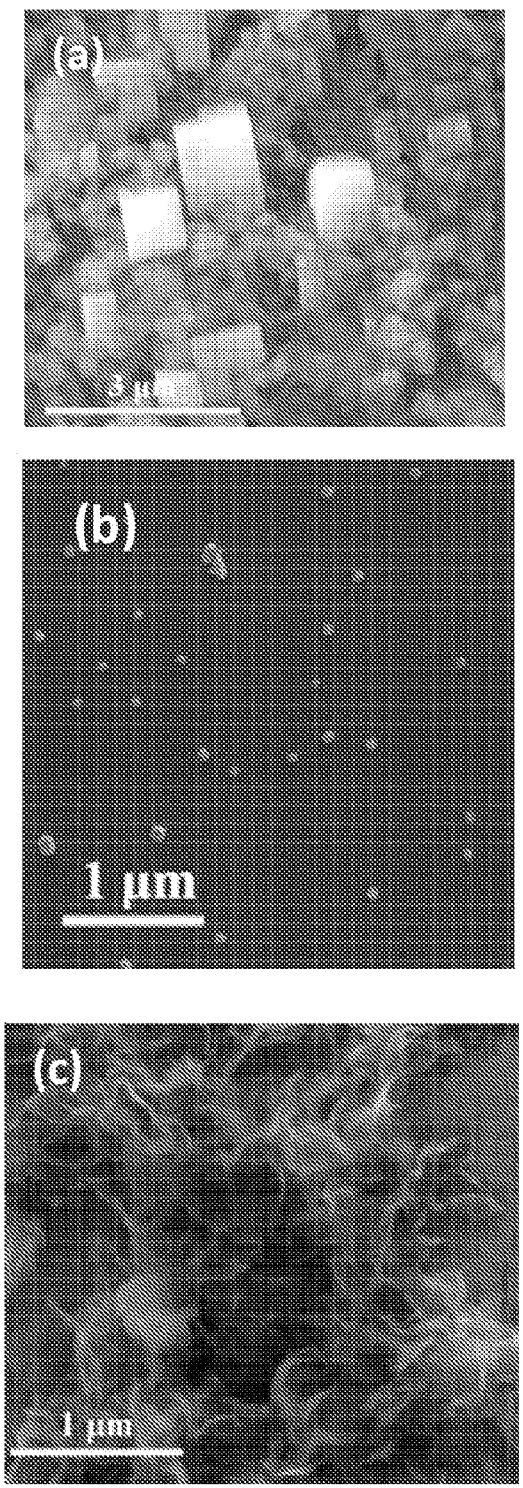

FIG. 3 provides scanning electron microscopy (SEM) images of CSH particles synthesized from $Na_2SiO_3 \cdot 5H_2O$ and $Ca(NO_3)_2 \cdot 4H_2O$ (FIG. 3A), $Ca(NO_3)_2 \cdot 4H_2O$ under $N_2$ (FIG. 3B), and $Ca(OH)_2$ (FIG. 3C). The CSH particles formed in 100 mL of dd-water after 2 hours of sonication in the presence of cetyltrimethylammonium bromide (CTAB).

Figure 4:
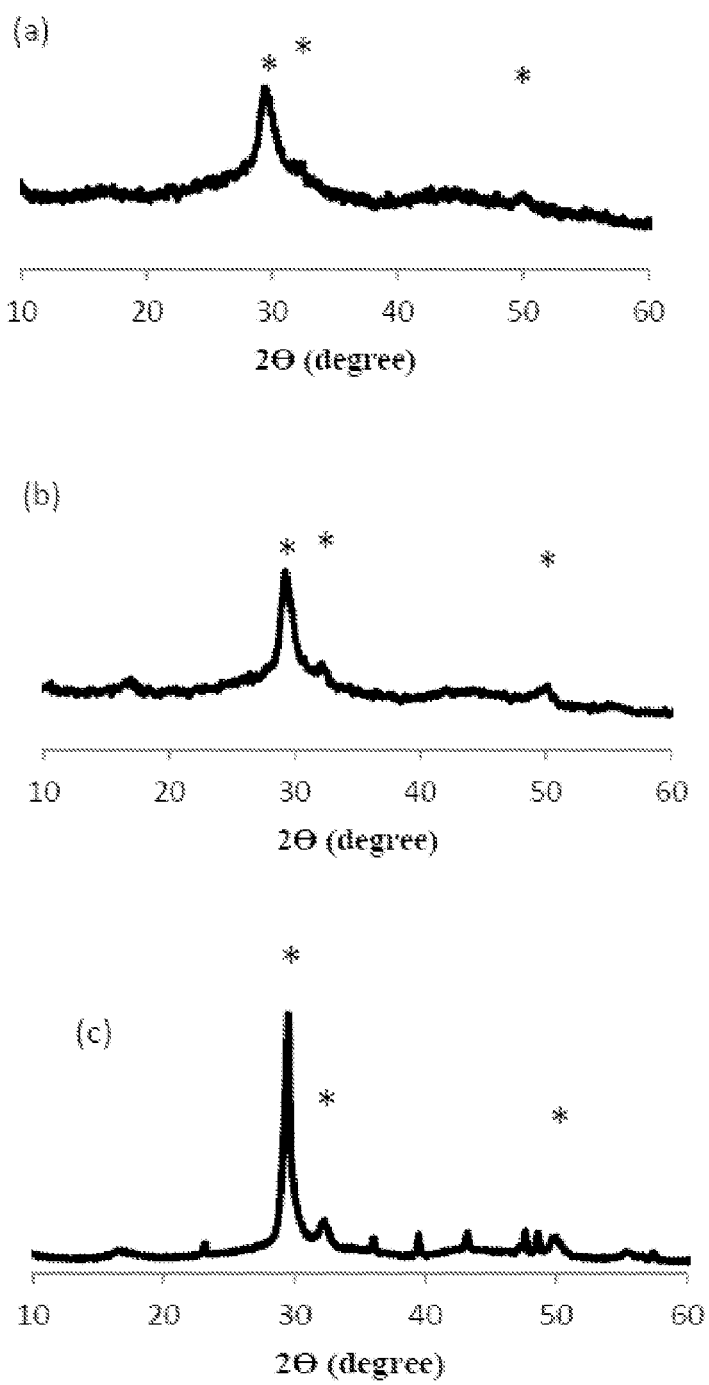

FIG. 4 provides powder-X-ray diffraction (PXRD) patterns of the CSH particles synthesized from $Na_2SiO_3 \cdot 5H_2O$ and $Ca(NO_3)_2 \cdot 4H_2O$ (FIG. 4A), $Ca(NO_3)_2 \cdot 4H_2O$ under $N_2$ (FIG. 4B), and $Ca(OH)_2$ (FIG. 4C).

Figure 5:
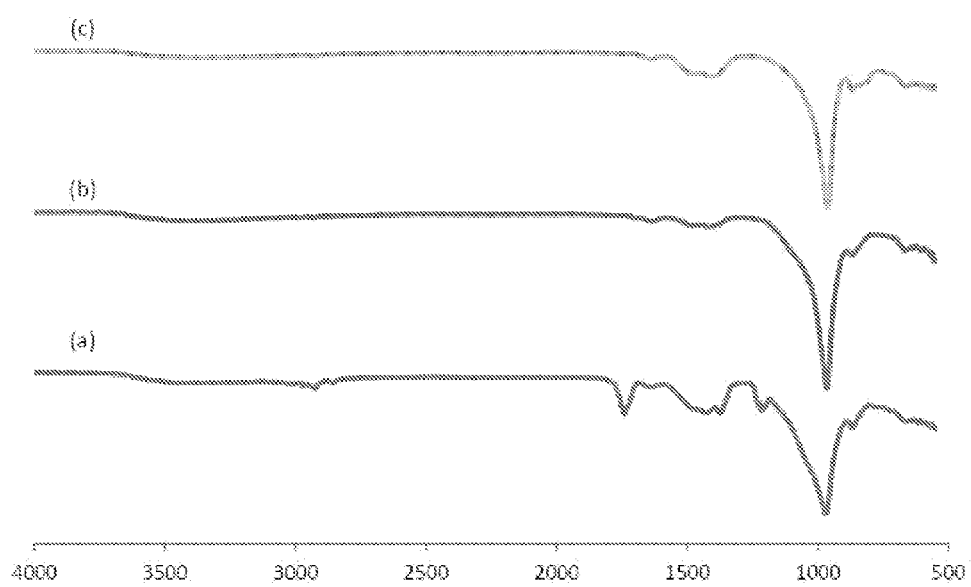

FIG. 5 provides Fourier transform infrared spectroscopy (FT-IR) spectra of CSH particles synthesized from $Na_2SiO_3 \cdot 5H_2O$ and $Ca(NO_3)_2 \cdot 4H_2O$ (FIG. 5A), $Ca(NO_3)_2 \cdot 4H_2O$ (reaction performed under $N_2$) (FIG. 5B) and $Ca(OH)_2$ (FIG. 5C).

Figure 6:
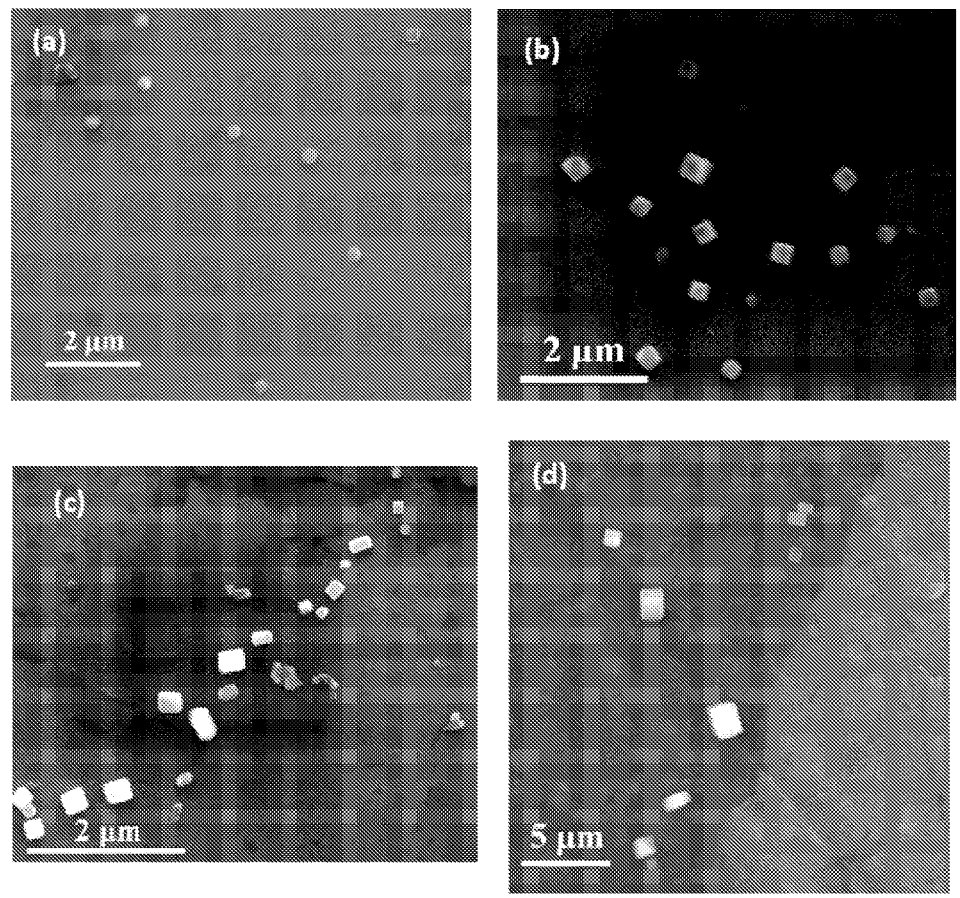

FIG. 6 provides SEM images of CSH particles with different stoichiometric ratios of the calcium source over the silicate source (C/S ratios), including 1.0 (FIGS. 6A-B), 1.5 (FIG. 6C), and 2.0 (FIG. 6D).

Figure 7:
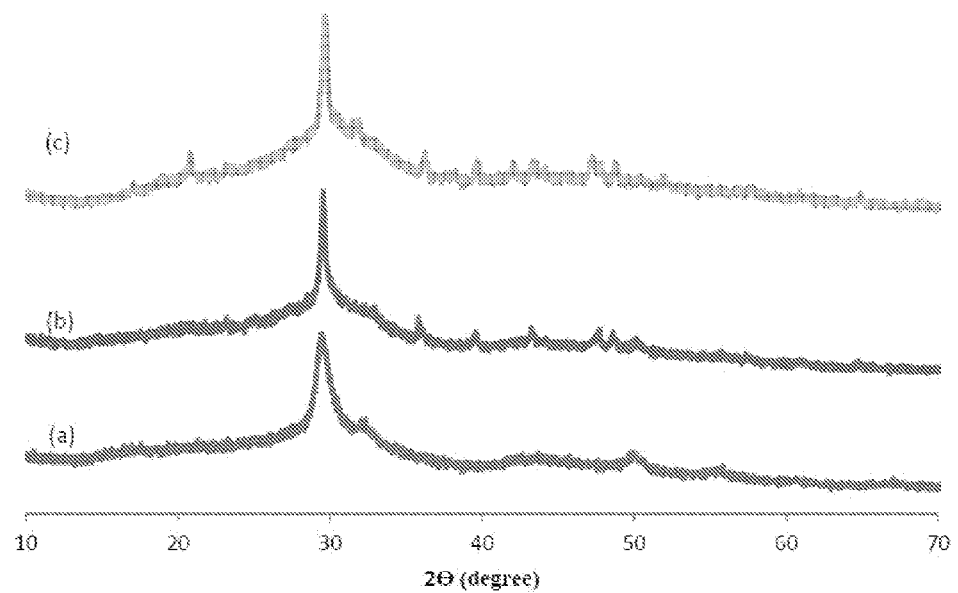

FIG. 7 shows PXRD patterns of CSH particles synthesized with C/S ratios, including 1.0 (FIG. 7A), 1.5 (FIG. 7B), and 2.0 (FIG. 7C).

Figure 8:
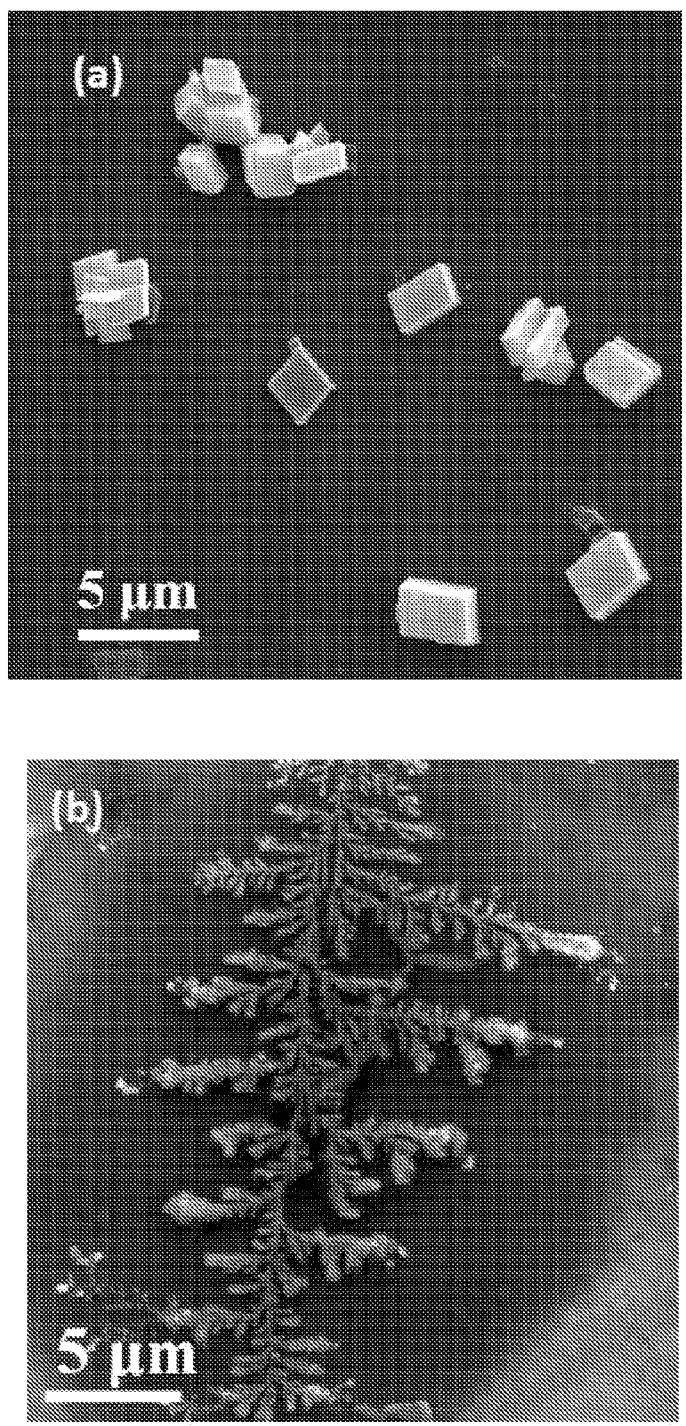

FIG. 8 provides SEM images of CSH particles synthesized in the presence of different water amounts, including 50 mL (FIG. 8A) and 200 mL (FIG. 8B).

Figure 9:
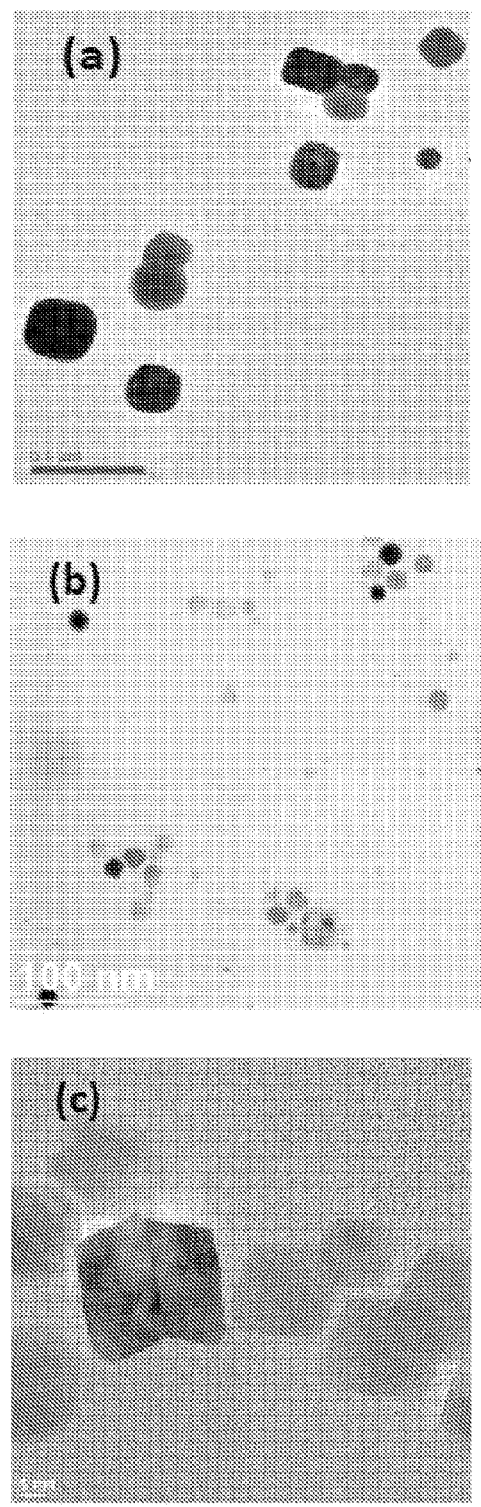

FIG. 9 provides transmission electron microscopy (TEM) images of CSH particles at various magnifications, including 0.5 μm (FIG. 9A), 100 nm (FIG. 9B), and 5 nm (FIG. 9C).

Figure 10:
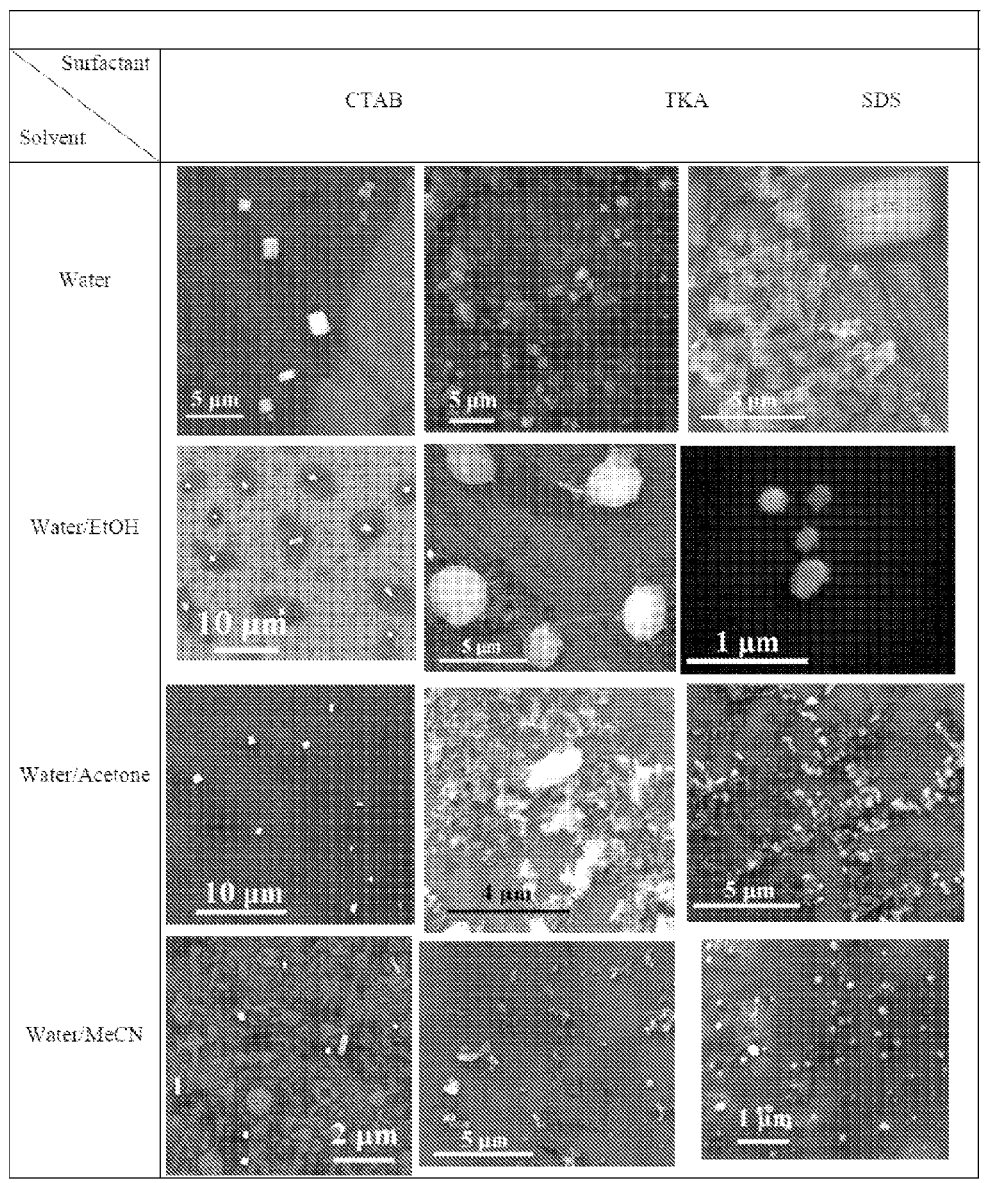

FIG. 10 provides comparative results on the effects of solvents and surfactants on the shape of CSH particles.

Figure 11:
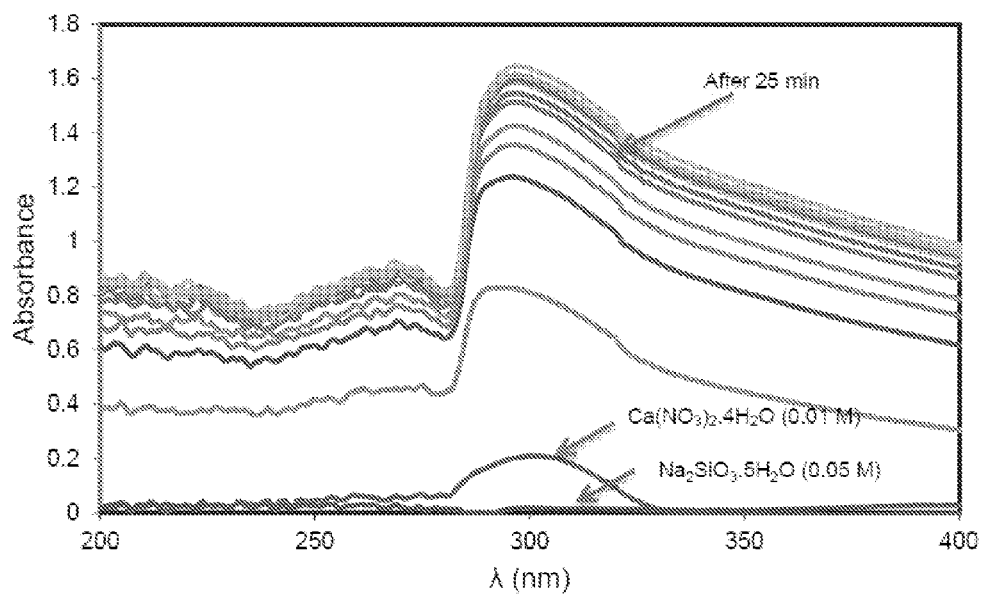

FIG. 11 provides a UV-Vis absorption spectrum of sodium metasilicate pentahydrate (0.05 M) and calcium nitrate tetra hydrate (1 M) before and after adding calcium to a silicate solution. The UV-Vis spectrum of the solution was taken during 65 minutes for 12 times.

Figure 12:
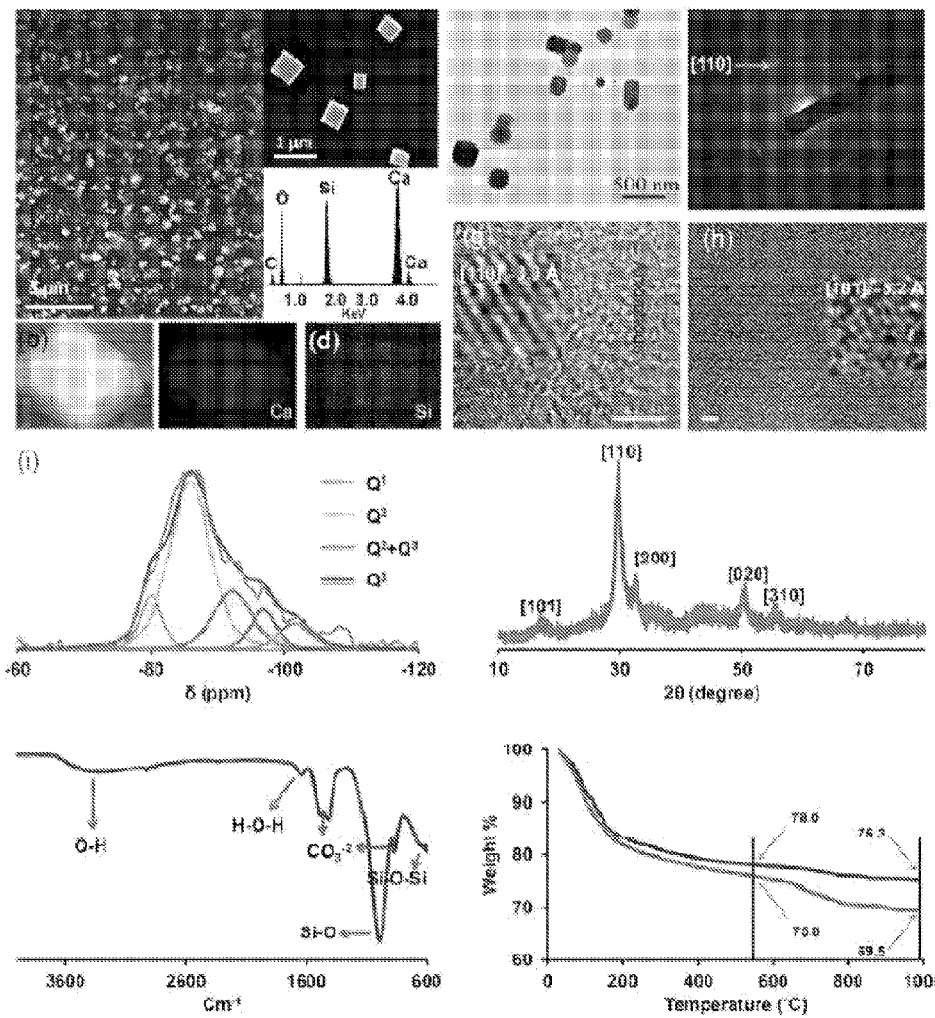

FIG. 12 provides data and images relating to CSH products with a C/S ratio of 1.5. FIG. 12A provides SEM images of the CSH products. The insets show a higher magnification image (top) and energy dispersive X-ray spectroscopy (EDAX) (bottom). FIGS. 12B-D show elemental mapping of the CSH microstructure by scanning electron microscopy-energy dispersive X-ray spectrometry (SEM-EDAX). FIG. 12E shows a TEM image of the cubic CSH particles under TEM (C/S=1.5). FIG. 12F provides selected area electron diffraction (SAED) of the cubic CSH particles (C/S=1.5). FIGS. 12G-H provide high resolution TEM (HRTEM) of the cubic particles (C/S=1.5). The insets show zoom-in pictures where the interlayer distances of (101) and (110) crystalline planes are visible. Scale bars are 3 nm. FIG. 12I provides a solid state Magic Angle Spectroscopy ($^{29}$Si MAS NMR) of the CSH product (C/S=1.5). FIG. 12J provides an IR spectrum of the CSH product. FIG. 12K provides an XRD pattern of the CSH product. FIG. 12L provides a thermogravimetric (TG) analysis of the CSH product.

Figure 13:
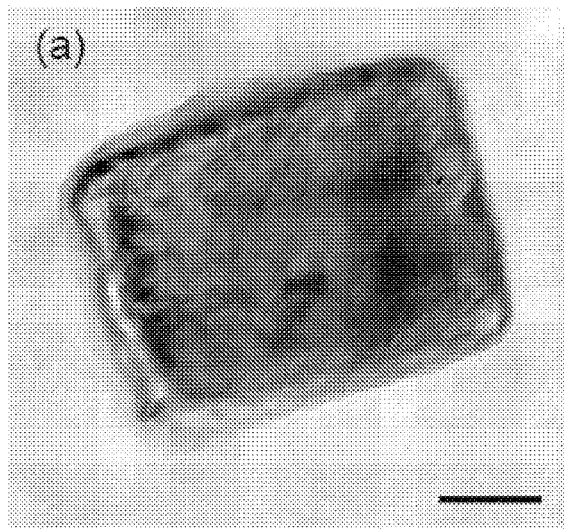
Figure 13:
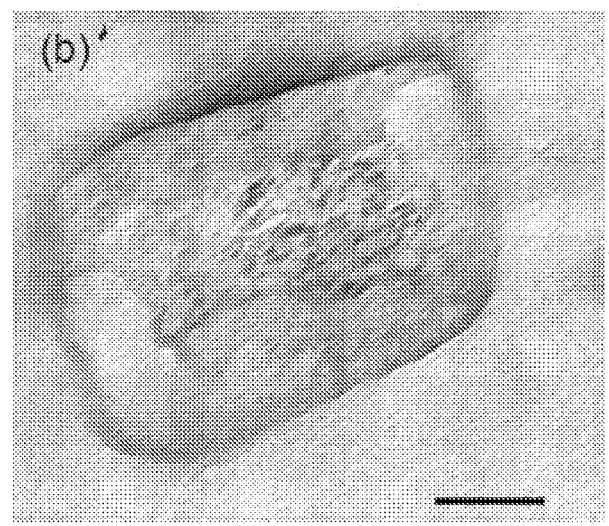

FIG. 13 provides TEM images of a molten CSH particle after few seconds of melting (FIG. 13A) and after 2 minutes of melting (FIG. 13B). The scale bars are 500 nm.

Figure 14:
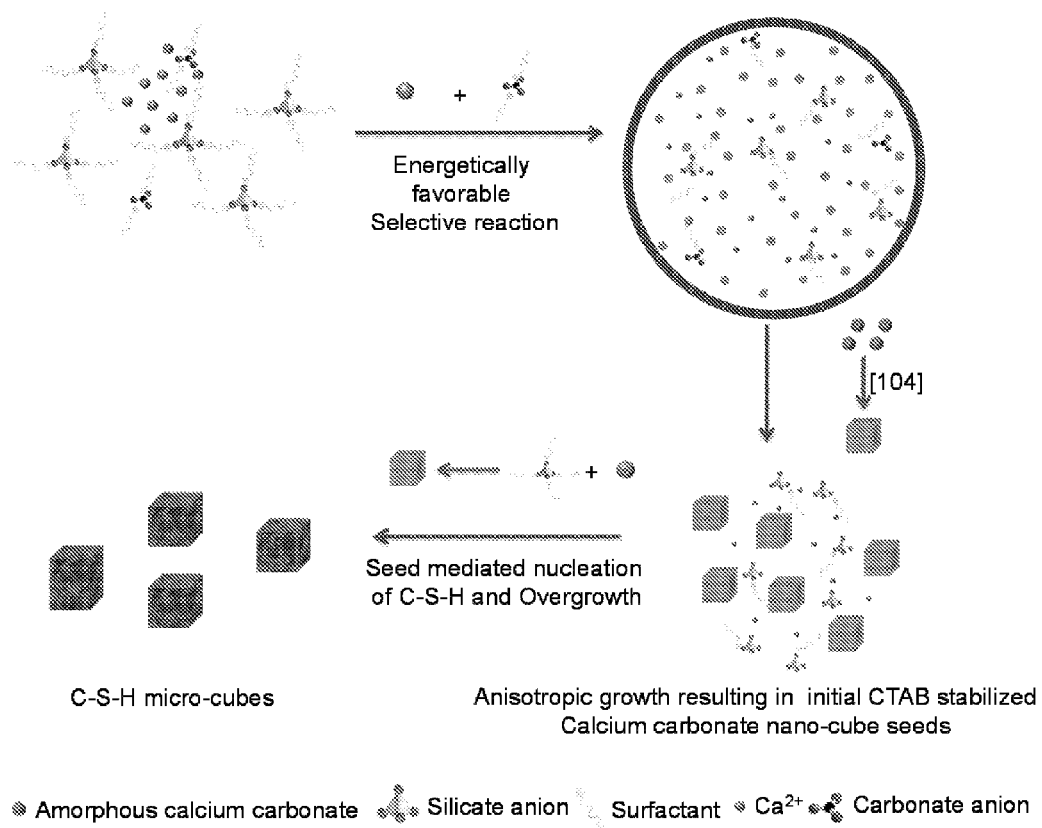

FIG. 14 provides a schematic illustration of the semi-epitaxial growth of CSH micro-cubes on calcium carbonate seeds.

Figure 15:
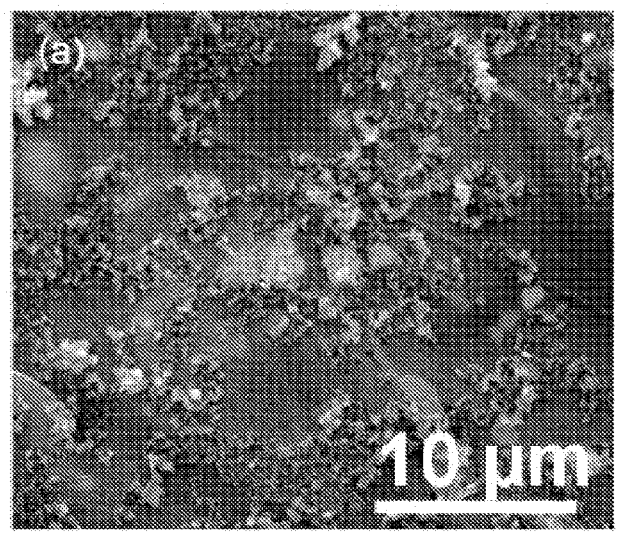
Figure 15:
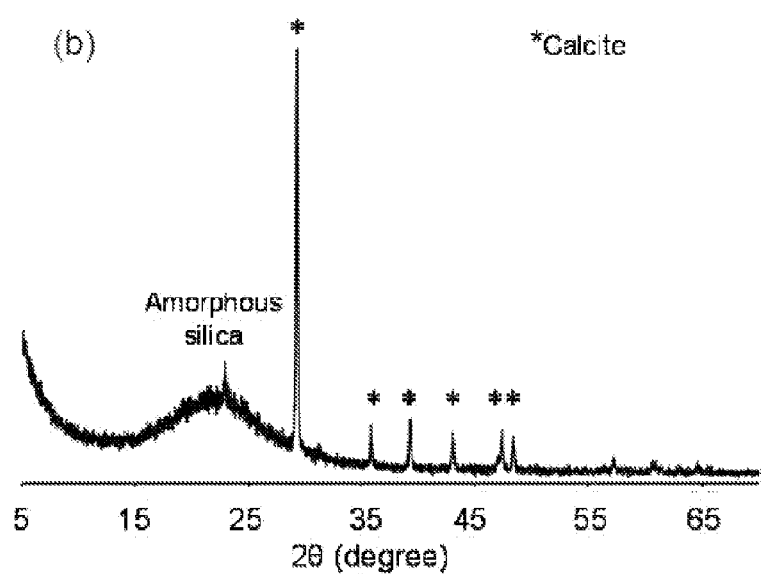

FIG. 15 provides an SEM image (FIG. 15A) and an XRD pattern (FIG. 15B) of a CSH precipitate under carbon dioxide bubbling.

Figure 16:
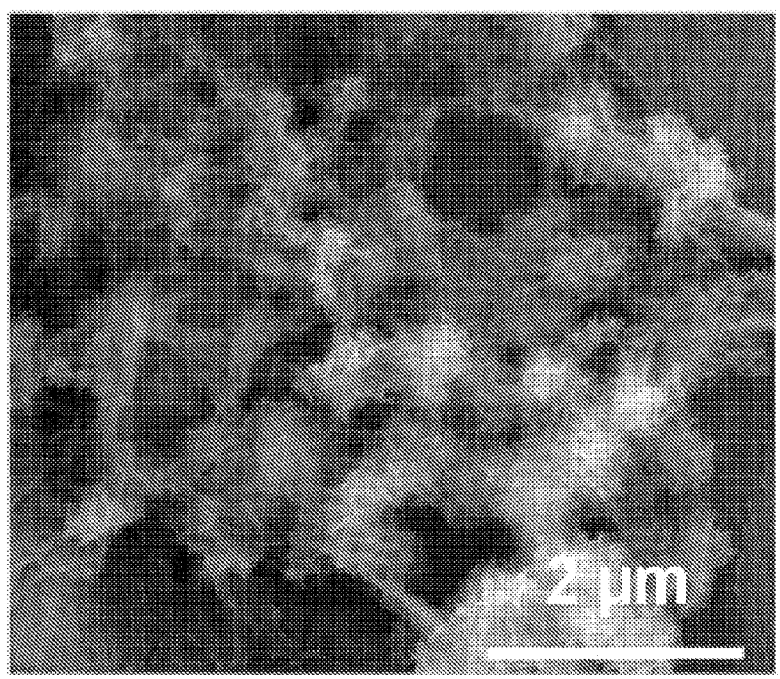

FIG. 16 provides an SEM image of CSH particles synthesized under $N_2$.

Figure 17:
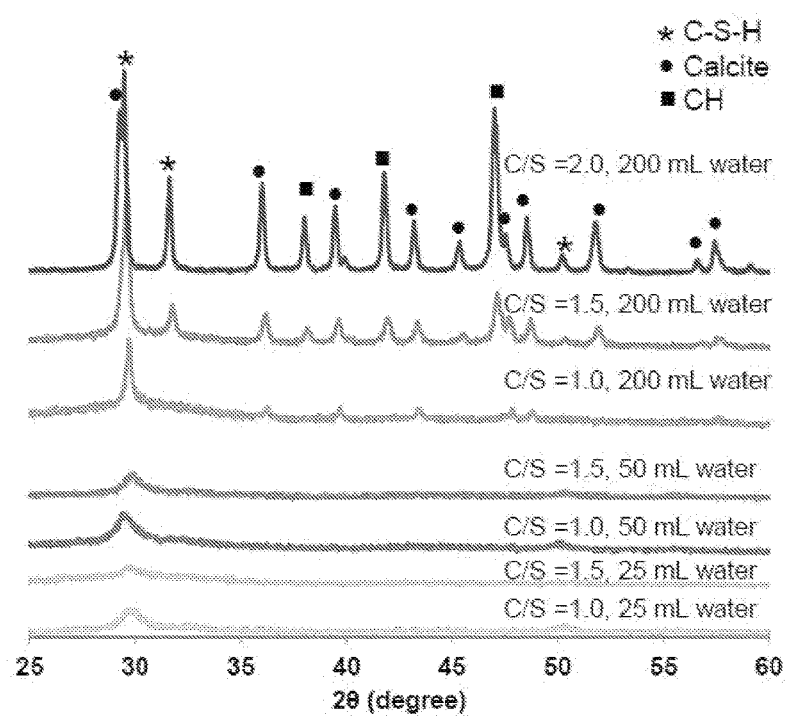

FIG. 17 provides XRD patterns of samples synthesized under different precursors concentrations.

Figure 18:
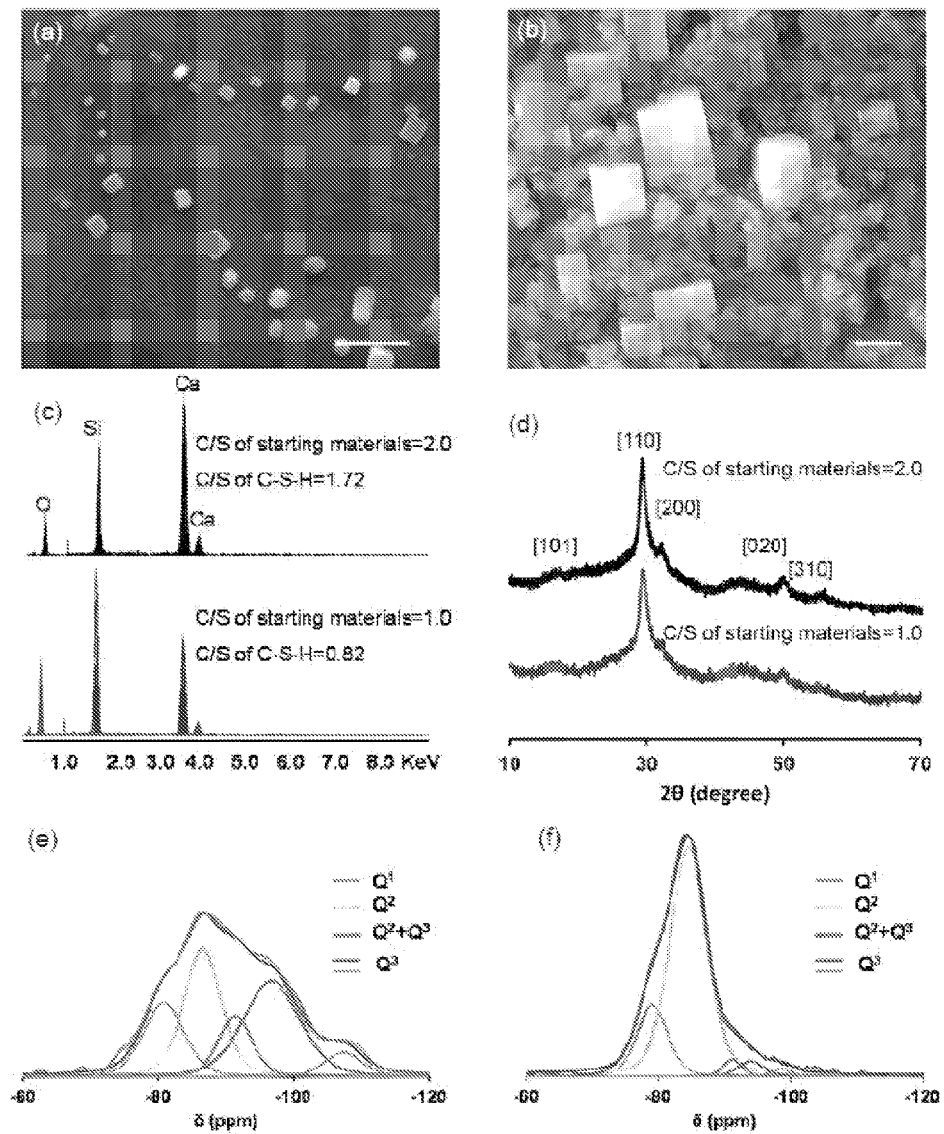

FIG. 18 provides data and illustrations regarding CSH synthesized with different C/S ratios. SEM images of the CSH products with C/S of 1.0 (FIG. 18A) and 2.0 (FIG. 18B) are shown. All scale bars show 1 μm. FIG. 18C provides an EDAX of the CSH products with C/S of 1.0 (Blue) and 2.0 (Black). FIG. 18D provides a powder-XRD pattern of the CSH samples synthesized with C/S 1.0 (Blue) and 2.0 (Black). $^{29}$Si MAS NMR of CSH samples with C/S of 1.0 (FIG. 18E) and 2.0 (FIG. 18F) are also shown.

Figure 19:
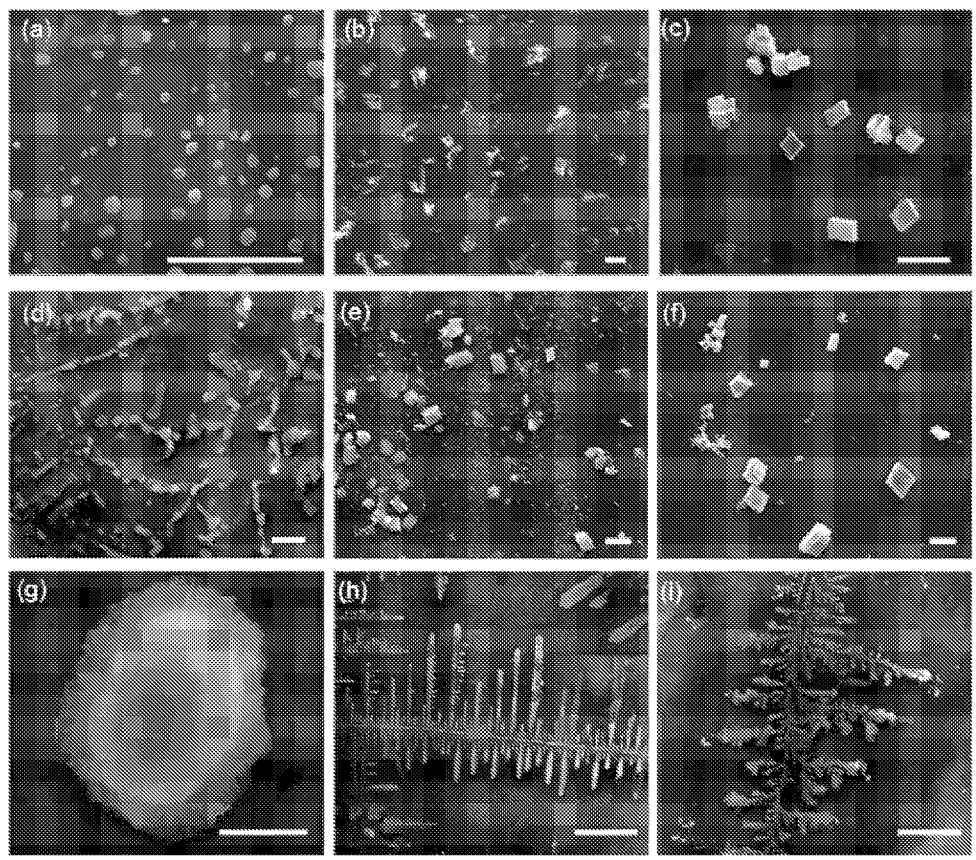

FIG. 19 provides SEM images of CSH particles synthesized in the presence of different precursor concentrations. For FIGS. 19A-C, the solvent volumes are 25 mL and the C/S ratios are 1.0 (FIG. 19A), 1.5 (FIG. 19B), and 2.0 (FIG. 19C). For FIGS. 19D-F, the solvent volumes are 50 mL and the C/S ratios are 1.0 (FIG. 19D), 1.5 (FIG. 19E), and 2.0 (FIG. 19F). For FIGS. 19G-I, the solvent volumes are 200 mL and the C/S ratios are 1.0 (FIG. 19G), 1.5 (FIG. 19H), and 2.0 (FIG. 19I). The scale bars shown are 5 μm.

Figure 20:
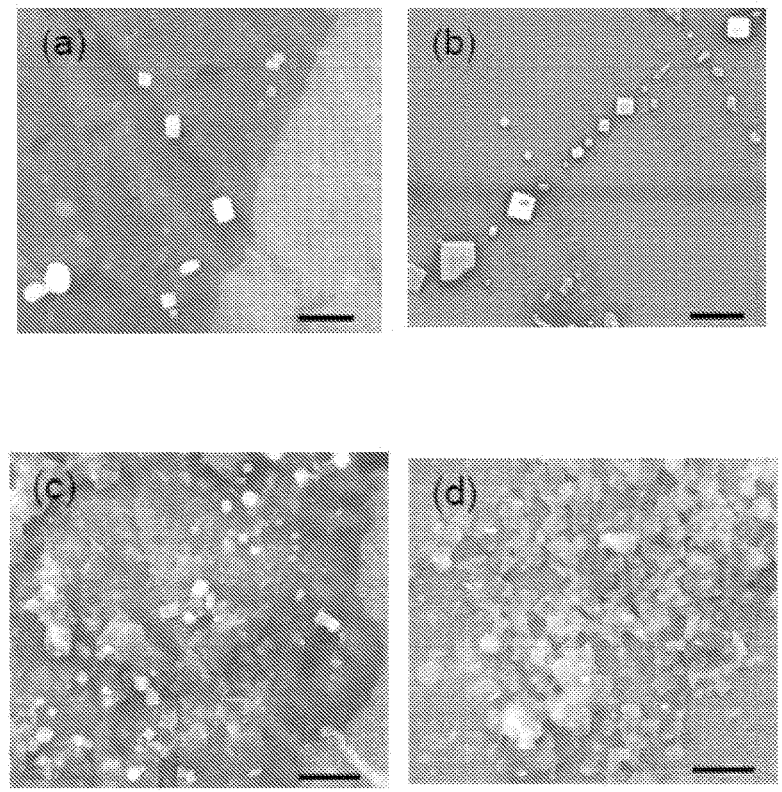

FIG. 20 provides SEM images of CSH particles synthesized in the presence of cationic and anionic surfactants, including CTAB (FIG. 20A), cethylpyridinium bromide (CPB) (FIG. 20B), tetra(decyl)ammonium bromide (TDAB) (FIG. 20C), and an anionic surfactant dodecyl sulfate sodium salt (SDS) (FIG. 20D). The scale bars shown are 5 μm.

Figure 21:
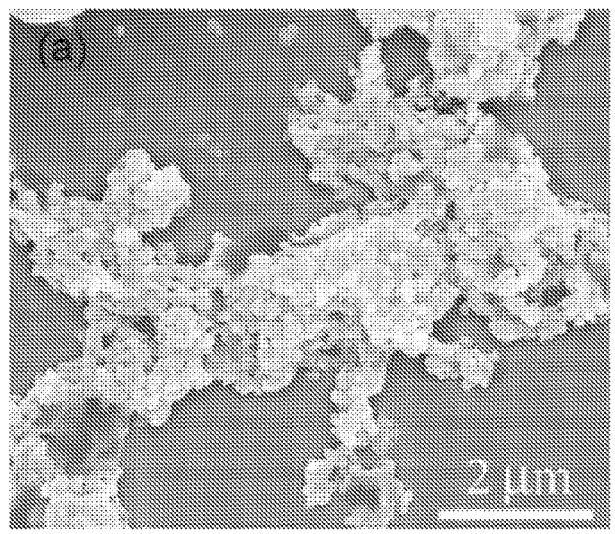
Figure 21:
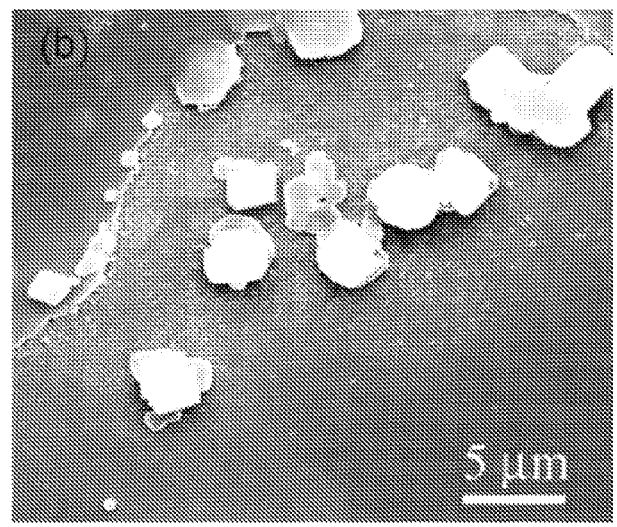

FIG. 21 provides a comparison of the reaction of sodium metasilicate pentahydrate and calcium nitrate tetrahydrate conducted via stirring (FIG. 21A) and sonication (FIG. 21B) methods.

Figure 22:
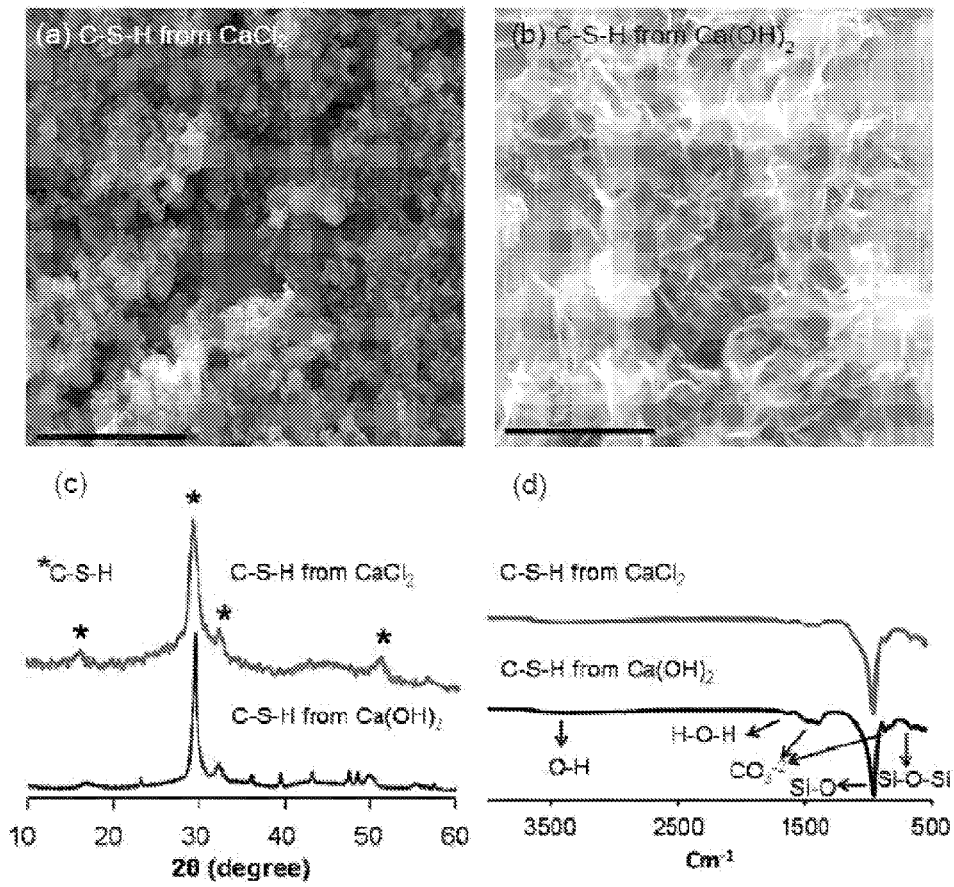

FIG. 22 provides data and illustrations of CSH particles synthesized in the presence of different calcium salts (C/S=2.0). SEM images of the CSH synthesized from $Na_2SiO_3 \cdot 5H_2O$ and $Ca(Cl)_2$ (FIG. 22A) and $Ca(OH)_2$ in the presence of CTAB (FIG. 22B), in 100 mL of $CO_2$ free dI-water after 2 hours of sonication. All scale bars show 1 μm. FIG. 22C provides PXRD pattern of the CSH (*), $CaCl_2$ (Red), and $Ca(OH)_2$ (Black). FIG. 22D shows FTIR spectra of CSH samples: $CaCl_2$ (Red), $Ca(OH)_2$ (Black).

Figure 23:
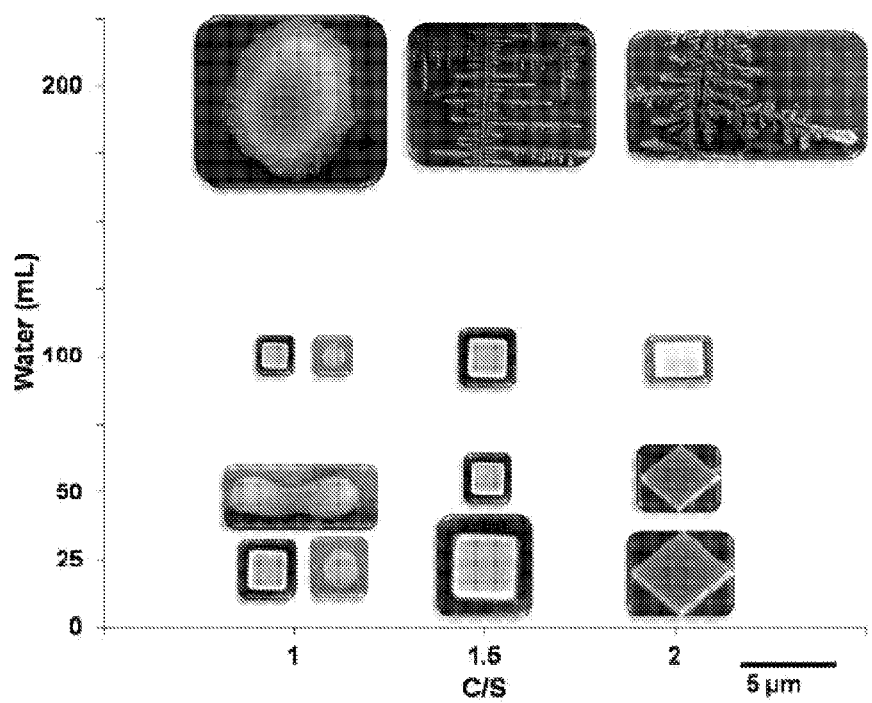

FIG. 23 provides an illustration of a set of diverse CSH morphologies via varying the synthesis processes.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

In recent years, material scientists have extensively investigated novel ways to control the shape of nanomaterials (e.g., nanoparticles). Controlling shapes of nanomaterials is becoming important in various practical applications since chemical and physical properties of nanomaterials can be tunable by their shapes.

The chemical and physical properties of nanoparticles can be intimately tuned by modulating their shapes and sizes. Hence, intense research efforts have been dedicated towards the shape- and/or size-selective synthesis of nanoparticles. Considerable progress has been achieved in this direction for simple crystalline materials such as gold nanoparticles, metal oxides, and semiconductor systems. However, there is no current understanding or reports on the synthesis or feasibility of controlling the shapes of nanoparticles in more complex systems, such as calcium silicates.

A prime example and one of the most economically relevant calcium silicate-based structures is calcium silicate hydrate, generally referred to as CSH. CSH is the primary product of cement hydration. CSH structures generally have a variable stoichiometry and distorted layered structures with multiple defects and porosities. As such, CSH particles are optimal systems for the exploration of the feasibility and kinetics of shape-controlled synthesis of complex nanoparticles with low symmetry and even amorphous substructures. In cement chemistry notation, C can be CaO, S can be $SiO_2$, and H can be $H_2O$. However, various combinations of other C, S and H are possible. The different phases are usually differentiated by the calcium to silicon (C/S) ratio, which typically span from ~0.7 to ~2.3, with an average of ~1.7.

Conventional synthetic methods for CSH preparations with controlled stoichiometry are generally based on the reaction of CaO and $SiO_2$, or the double decomposition of a Ca-salt and an alkali silicate in aqueous solution. As an example, a double decomposition methodology has been used to synthesize CSH with various C/S ratios. In this method, $Na_2SiO_3 \cdot 5H_2O$ was dissolved in carbon dioxide-free deionized water. Thereafter, $Ca(NO_3)_2 \cdot 4H_2O$ was added to precipitate CSH. Other studies used a so-called pozzolanic reaction to directly mix CaO and $SiO_2$ in solution to precipitate CSH with various C/S ratios. However, in both of these key conventional approaches, there is no control over the size and shape of the CSH particles.

Controlling the morphology, crystal size, composition and structure of calcium silicate nanoparticles are important to determining their biocompatibility, stability, heat-insulating ability, low dielectric loss, and mechanical properties. Moreover, it would be beneficial to gain precise control over the morphology of CSH based nanomaterials, since this strategy will open up a wide variety of possibilities to assemble them into macrostructures, thereby leading to the next generation of structural materials with optimal properties.

To date, the few reported studies on controlled synthesis of CSH nanostructures deal mainly with forms such as needles, nanowires, nanobelts, and hollow microspheres. The methods for synthesizing such nanostructures include solid-state reactions, sol-gel, hydrothermal reactions, precipitation methods, microwave-assisted methods, and sonochemical methods. More advanced studies have used a hydrothermal microemulsion method to synthesize monodisperse wollastonite nanowires with diameters of ~20-30 nm and up to tens of micrometers in length. For instance, tobermorite nanowires have been fabricated by this method after hydrothermal treatment. After calcination at 800° C. for 2 hours, tobermorite nanowires transformed to wollastonite nanowires and the wire-like structure was preserved.

Another study developed a method to obtain calcium silicate nanostructured porous hollow ellipsoidal capsules, which were constructed by nanoplate networks using the inorganic $CaCO_3$ template. This study first synthesized $CaCO_3$ ellipsoids via the reaction between $Ca(CH_3COO)_2$ and $NaHCO_3$ in a water-ethylene glycol mixed solvent at room temperature. The products were then used as the calcium source. Next, the study added a $SiO_3^{2-}$ source to react with $CaCO_3$ to form a $CaSiO_3$ shell on the surface of $CaCO_3$ ellipsoids. The study also reported synthesis of hierarchically nanostructured mesoporous spheres of CSH. In a more recent work, a low-crystalline 1.4 nm tobermorite-like CSH ultrathin nano-sheets with a thickness of 2.8 nm and a large specific surface area was made via a reaction-rate controlled precipitation process.

As such, a need exists for improved methods of making CSH particles, where the morphology (e.g., shape) of the formed particles can be controlled. Various aspects of the present disclosure address this need.

In some embodiments, the present disclosure pertains to methods of forming calcium-silicate-hydrate particles. In some embodiments, the methods of the present disclosure can control the morphology of the formed calcium-silicate hydrate particles. In some embodiments, the present disclosure pertains to the formed calcium-silicate hydrate particles.

Methods of Forming Calcium-Silicate-Hydrate Particles

Various aspects of the present disclosure pertain to methods of forming calcium-silicate-hydrate particles. In some embodiments, such methods include mixing a calcium source with a silicate source. In some embodiments, the mixing includes sonication. In some embodiments, the mixing occurs in the presence of a surfactant and a solvent. In some embodiments, the mixing results in formation of the calcium-silicate-hydrate particles. In some embodiments, one or more reaction conditions may be adjusted in order to control the morphology of the formed calcium-silicate-hydrate particles.

More specific embodiments of methods of forming calcium-silicate-hydrate particles is illustrated in FIG. 1A, where the method involves mixing a calcium source with a silicate source (step 10), sonicating the mixture in the presence of a surfactant and a solvent (step 12), adjusting reaction conditions (step 14), and obtaining calcium-silicate-hydrate particles with desired morphologies (step 16). As set forth in more detail herein, various calcium sources, silicate sources, surfactants, mixing conditions, and reaction conditions may be utilized to form various types of calcium-silicate-hydrate particles.

Surfactants

The present disclosure may utilize various types of surfactants. For instance, suitable surfactants can include, without limitation, anionic surfactants, cationic surfactants, zwitterionic surfactants, and combinations thereof. In some embodiments, the surfactants of the present disclosure (e.g., cationic surfactants) include variable chain lengths and counter ions. In some embodiments, the counter ions of the surfactants of the present disclosure (e.g., cationic surfactants) include, without limitation, bromide, chloride, tetrafluoroborate, hexafluorophosphate, and combinations thereof.

In some embodiments, the surfactants of the present disclosure include cationic surfactants. In some embodiments, the cationic surfactants include, without limitation, cetyltrimethylammonium bromide (CTAB), cethylpyridinium bromide (CPB), decyltrimethylammonium bromide, dodecyltrimethylammonium bromide (DTAB), hexadecyltrimethylammonium bromide (HTAB), tetra(decyl)ammonium bromide (TDAB), cetyltrimethylammonium chloride, cetyltrimethylammonium tetrafluoroborate, cetyltrimethylammonium hexafluorophosphate, and combinations thereof.

In some embodiments, bromide counter ions in the cationic surfactants of the present disclosure may be substituted with other counter ions. In some embodiments, the other counter ions may include, without limitation, chloride, tetrafluoroborate, hexafluorophosphate, and combinations thereof.

In some embodiments, the present disclosure may utilize anionic surfactants, such as dodecyl sulfate sodium salt (SDS). In some embodiments, the surfactants that are utilized in the methods of the present disclosure may lack anionic surfactants. Without being bound by theory, it is envisioned that, in some embodiments, anionic surfactants may protect and hinder the reaction and formation of various calcium sources (e.g., reaction of $Ca^{2+}$ with $CO_3^{2-}$ to form calcium carbonate seeds) for the growth of calcium-silicate-hydrate particles. On the other hand, it is envisioned that cationic surfactants can considerably guide the formation and uniform growth of well-defined calcium-silicate-hydrate particles.

The reaction mixtures of the present disclosure can include various amounts of surfactants. For instance, in some embodiments, the surfactants of the present disclosure (e.g., cationic surfactants) have a concentration ranging from about 0.1% to about 60% by weight of a reaction mixture. In some embodiments, the surfactants of the present disclosure have a concentration ranging from about 0.5% to about 20% by weight of a reaction mixture. Additional surfactant concentration ranges can also be envisioned.

Solvents

The present disclosure may also utilize various types of solvents. For instance, in some embodiments, suitable solvents can include, without limitation, water, acetone, alcohols, ethanol, methanol, 2-propanol, methanol, n-propanol, n-butanol, ethyl acetate, methyl acetate, dimethylformamide, dimethyl sulfoxide, acetonitrile, glycol ethers, poly ethylene glycol (PEG), and combinations thereof. The use of additional solvents can also be envisioned.

The solvents of the present disclosure can be utilized in various volumes in reaction mixtures. For instance, in some embodiments, about 25 ml to about 500 ml of solvent may be utilized. In some embodiments, about 25 ml to about 200 ml of solvent may be utilized. In some embodiments, about 25 ml of solvent may be utilized. In some embodiments, about 50 ml of solvent may be utilized. In some embodiments, about 100 ml of solvent may be utilized. In some embodiments, about 200 ml of solvent may be utilized.

Calcium Sources

The present disclosure may also utilize various types of calcium sources. In some embodiments, the calcium sources of the present disclosure may include one or more counter ions. In some embodiments, the counter ions may include, without limitation, organic counter ions, inorganic counter ions (e.g., acetates), and combinations thereof. In some embodiments, suitable calcium sources can include, without limitation, calcium salts, calcium nitrate, calcium carbonate, calcium hydroxide, calcium acetate, calcium chloride, calcium oxide, and combinations thereof. In some embodiments, the calcium source includes calcium carbonate. The use of additional calcium sources can also be envisioned.

In some embodiments, the calcium source may be in powder form prior to mixing with the silicate source. In some embodiments, the calcium source may be in liquid form prior to mixing with the silicate source. In some embodiments, the calcium source is pre-mixed with a surfactant prior to mixing with the silicate source. In some embodiments, the pre-mixing involves sonication.

Silicate Sources

The present disclosure may also utilize various types of silicate sources. The silicate sources of the present disclosure may also include various counter ions. For instance, in some embodiments, the counter ions may include, without limitation, various functional groups, acids, and salts. In some embodiments, the counter ions of the silicate sources of the present disclosure may include, without limitation, potassium, sodium, and combinations thereof.

The silicate sources of the present disclosure may include various degrees of hydration. For instance, in some embodiments, the silicate sources of the present disclosure are unhydrated. In some embodiments, the silicate sources of the present disclosure are hydrated. In some embodiments, the silicate sources of the present disclosure are pentahydrated. In some embodiments, the silicate sources of the present disclosure have variable degrees of crystal water (e.g., unhydrated, pentahydrated, and non-hydrated).

In some embodiments, suitable silicate sources can include, without limitation, sodium silicates, silicon oxide, silicon monoxide, silicon dioxide, silicon tetraoxide, silicic acid, sodium silicates, potassium silicates, sodium metasilicate pentahydrate, and combinations thereof. The silicate sources of the present disclosure may include different numbers of crystal waters. For instance, in some embodiments, the silicate sources include sodium silicates and potassium silicates with different numbers of crystal water. In some embodiments, the silicate source includes silicon tetraoxide. The use of additional silicate sources can also be envisioned. In some embodiments, the silicate source may be in powder form prior to mixing with the calcium source. In some embodiments, the silicate source may be in liquid form prior to mixing with the calcium source. In some embodiments, the silicate source is pre-mixed with a surfactant prior to mixing with the calcium source. In some embodiments, the pre-mixing involves sonication.

Mixing Conditions

The methods of the present disclosure may utilize various mixing conditions. For instance, in some embodiments, the mixing occurs under flow of an inert gas. In some embodiments, the inert gas includes, without limitation, argon, nitrogen, and combinations thereof. In some embodiments, the inert gas is argon. In some embodiments, the mixing occurs under the flow of carbon dioxide.

Reaction conditions can be adjusted in various manners. For instance, in some embodiments, the pH of a reaction mixture is adjusted by adding NaOH to a reaction mixture. Additional methods of adjusting reaction conditions can also be envisioned.

In some embodiments, the mixing occurs by sonicating the calcium source and the silicate source. In some embodiments, the sonication occurs in the presence of a surfactant and a solvent. In some embodiments, the sonication occurs from about 10 seconds to about 10 hours. In some embodiments, the sonication occurs from about 10 minutes to about 5 hours. In some embodiments, the sonication occurs from about 5 minutes to about 180 minutes. In some embodiments, the sonication occurs for about 2 hours. In some embodiments, the sonication occurs for about 100 minutes. In some embodiments, the sonication occurs for about 40 minutes. In some embodiments, the sonication occurs for about 20 minutes.

In some embodiments, the sonication occurs from a time range of less than 10 minutes to at least 5 hours. In some embodiments, the sonication occurs at a time range of between 2 hours and 8 hours.

Various sonicating conditions may also be utilized. For instance, in some embodiments, the sonication occurs in a sonication bath, such as a commercial ultrasonic bath. In some embodiments, the sonication occurs by the utilization of a sonication tip that is inserted into a solution containing the calcium source and the silicate source.

Sonication can occur at various temperatures. For instance, in some embodiments, the sonication temperature is less than 25° C. In some embodiments, the sonication temperature is about 25° C. In some embodiments, the sonication temperature is between 25° C. and 80° C. In some embodiments, the sonication temperature is about 80° C. In some embodiments, the sonication temperature is higher than 80° C. In some embodiments, the sonication temperature ranges from less than room temperature to about 80° C. Additional sonication temperatures can also be envisioned.

Sonication can also occur at various amplitudes. For instance, in some embodiments, the sonication amplitude ranges from about 20% to about 100%. In some embodiments, the sonication amplitude ranges from about 20% to about 80%. In some embodiments, the sonication amplitude ranges from about 20% to about 50%. In some embodiments, the sonication amplitude ranges from about 20% to about 40%.

In some embodiments, the methods of the present disclosure occur without the utilization of conventional steps of forming calcium-silicate-hydrate particles. For instance, in some embodiments, the methods of the present disclosure occur without the use of at least one of solid-state reactions, sol-gel reactions, hydrothermal reactions, precipitation methods, microwave-assisted methods, hydrothermal microemulsion reactions, and combinations thereof.

In some embodiments, the calcium-silicate-hydrate particles precipitate upon formation. Therefore, in some embodiments, the methods of the present disclosure may also include one or more steps of separating the precipitated calcium-silicate-hydrate particles from the reaction mixture.

In some embodiments, the calcium source and the silicate source may be directly added to a reaction mixture that contains a solvent and a surfactant. In some embodiments, a silicate source is pre-mixed with a surfactant prior to mixing the calcium source with the silicate source. Thereafter, the calcium source can be added to the pre-mixed solution that includes the silicate source and the surfactant.

In some embodiments, the pre-mixed silicate source and surfactant are sonicated prior to mixing the calcium source with the silicate source. In some embodiments, the pre-mixed silicate source and surfactant are sonicated for at least 20 minutes. In some embodiments, the pre-mixed silicate source and surfactant are sonicated for at least 30 minutes. In some embodiments, the pre-mixed silicate source and surfactant are sonicated for about 1 hour. In some embodiments, the pre-mixed silicate source and surfactant are sonicated from about 30 minutes to about 1 hour.

A calcium source may be added to a pre-mixed solution of a silicate source and a surfactant in various manners. For instance, in some embodiments, the calcium source is added to a pre-mixed solution of a silicate source and a surfactant in a single batch. In some embodiments, a calcium source is added to a pre-mixed solution of a silicate source and a surfactant in an incremental manner (e.g., 5-6 aliquots).

A calcium source may be added to a pre-mixed solution of a silicate source and a surfactant at various flow rates. In some embodiments, the flow rate of the calcium source is adjusted by a liquid flow meter. In some embodiments, the calcium source flow rate ranges from about 1% to about 20% of added calcium source by weight per minute. In some embodiments, the calcium source flow rate ranges from about 1% to about 10% of added calcium source by weight per minute. In some embodiments, the calcium source flow rate ranges from about 1% to about 5% of added calcium source by weight per minute.

Controlling the Morphology of the Calcium-Silicate Hydrate Particles

In some embodiments, the methods of the present disclosure also include a step of controlling the morphology of the calcium-silicate-hydrate particles. In some embodiments, the controlled morphology can include, without limitation, shape, size, texture, porosity, patterns, and combinations thereof.

In some embodiments, the morphology of the calcium-silicate-hydrate particles can be controlled by at least one or more of the following steps: controlling the sonication time; controlling the sonication temperature; controlling the sonication amplitude; selecting the solvent; selecting the solvent volume; selecting the calcium source; selecting a concentration of the calcium source; selecting the silicate source; selecting a concentration of the silicate source; selecting the surfactant; selecting a concentration of the surfactant; selecting a stoichiometric ratio of the calcium source over the silicate source; controlling the rate of adding a calcium source or a silicate source to a reaction mixture; adjusting a gas flow during the reaction; adjusting the reaction pH; and combinations thereof.

In some embodiments, the morphology of the calcium-silicate-hydrate particles can be controlled without altering all of the reaction conditions. For instance, in some embodiments, the morphology of the calcium-silicate-hydrate particles can be controlled without altering reaction temperature, pH, or the type of solvent.

In more specific embodiments, the morphology of the calcium-silicate-hydrate particles is controlled by selecting a stoichiometric ratio of the calcium source over the silicate source. For instance, in some embodiments, the stoichiometric ratio of the calcium source over the silicate source can be adjusted to values that range from about 0.5 to about 3. In some embodiments, the stoichiometric ratio of the calcium source over the silicate source can be adjusted to values of less than 0.5, 0.5 to 1.0, less than 1.0, 1.0, more than 1.0, between 1.0 and 1.5, 1.5, between 1.5 and 2.0, 2.0, or greater than 2.0. In some embodiments, the stoichiometric ratio of the calcium source over the silicate source can be adjusted to values that range from 1.0 to 1.8. In some embodiments, the stoichiometric ratio of the calcium source over the silicate source can be adjusted to a value of 1.8. In some embodiments, the stoichiometric ratio of the calcium source over the silicate source can be adjusted to values of at least one of less than 0.5, 0.5, 0.8, 1.0, 1.2, 1.5, 1.7, 2.0, or greater than 2.0.

In some embodiments, the stoichiometric ratio of the calcium source over the silicate source can be adjusted to less than 1.0, and 1.0. In some embodiments, the stoichiometric ratio of the calcium source over the silicate source can be adjusted between 1.0 and 1.5. In some embodiments, the stoichiometric ratio of the calcium source over the silicate source can be adjusted to a value of 1.5. In some embodiments, the stoichiometric ratio of the calcium source over the silicate source can be adjusted to between 1.5 and 2.0, 2.0, or greater than 2.0.

The reaction mixtures of the present disclosure can contain various amounts of calcium sources and silicate sources. For instance, in some embodiments, the reaction mixtures of the present disclosure include from about 1.5 mmol to about 6.0 mmol of total silicon and calcium raw materials.

The stoichiometric ratio of the calcium source over the silicate source can be utilized to control the morphology of the calcium-silicate-hydrate particles of the present disclosure in various manners. For instance, in some embodiments, lowered stoichiometric ratios of the calcium source over the silicate source (e.g., 1.0) can be utilized to form spherical calcium-silicate-hydrate particles. Likewise, in some embodiments, elevated stoichiometric ratios of the calcium source over the silicate source (e.g., 1.5) can be utilized to form cubic and rectangular calcium-silicate-hydrate particles. In some embodiments, elevated stoichiometric ratios of the calcium source over the silicate source (e.g., 1.5-2.0) can also be utilized to form calcium-silicate-hydrate particles with larger particle sizes.

Formation of Calcium-Silicate Hydrate Particles

Without being bound by theory, it is envisioned that calcium-silicate hydrate particles can form by various methods. For instance, in some embodiments, calcium-silicate hydrate particles can form by seed mediated growth. In some embodiments, the calcium source serves as seed particles to mediate the calcium-silicate hydrate particle growth. In some embodiments, the seed particles include calcite seeds, such as amorphous spherical seeds of calcite. In some embodiments, nucleation and growth of calcium-silicate hydrate particles occurs on in-situ formed seeds (e.g., calcium carbonate seeds). In some embodiments, the nucleation happens on the surface of the seeds.

In some embodiments, the calcium-silicate hydrate particles can grow by anisotropic growth. In some embodiments, the calcium-silicate hydrate particles can grow by epitaxial growth or semi-epitaxial growth. In some embodiments, the growth process can be facilitated by surfactants, such as cationic surfactants. An example of a method of forming calcium-silicate hydrate particles is illustrated in the scheme in FIG. 14 and described in more detail in Example 3.

Calcium-Silicate Hydrate Particles

The methods of the present disclosure can be used to form various types of calcium-silicate-hydrate particles with various shapes in a controllable manner. Further embodiments of the present disclosure pertain to the calcium-silicate-hydrate particles that are formed by the methods of the present disclosure. Additional embodiments pertain to compositions that contain the calcium-silicate-hydrate particles of the present disclosure. In some embodiments, the calcium-silicate-hydrate particles are derived from a calcium source and a silicate source. Suitable calcium sources and silicate sources were previously described. As also described previously, the calcium-silicate-hydrate particles of the present disclosure can have various stoichiometric ratios of the calcium source over the silicate source.

Calcium-Silicate Hydrate Particle Morphologies

The calcium-silicate-hydrate particles of the present disclosure can have various morphologies. For instance, in some embodiments, the calcium-silicate-hydrate particles of the present disclosure have various shapes. In some embodiments, the shapes include, without limitation, cubic shapes, rectangular shapes, spherical shapes, rod-like shapes, rhombohedra shapes, core-shell-like shapes, dendritic shapes, agglomerated dendritic shapes, irregular shapes, and combinations thereof.

In some embodiments, the calcium-silicate-hydrate particles of the present disclosure have cubic shapes. In some embodiments, the calcium-silicate-hydrate particles of the present disclosure have rod-like shapes. In some embodiments, the calcium-silicate-hydrate particles of the present disclosure have rectangular shapes. In some embodiments, the calcium-silicate-hydrate particles of the present disclosure are in the shape of rectangular prisms.

The calcium-silicate-hydrate particles of the present disclosure may also be in various sizes. For instance, in some embodiments the calcium-silicate-hydrate particles of the present disclosure include diameters ranging from about 100 nm to about 5 µm. In some embodiments, the calcium-silicate-hydrate particles of the present disclosure include diameters ranging from about 250 nm to about 1 µm. In some embodiments, the calcium-silicate-hydrate particles of the present disclosure include diameters ranging from about 400 nm to about 800 nm.

In some embodiments, the calcium-silicate-hydrate particles of the present disclosure include diameters of less than 100 nm. In some embodiments, the calcium-silicate-hydrate particles of the present disclosure include diameters of less than 250 nm. In some embodiments, the calcium-silicate-hydrate particles of the present disclosure include diameters of at least 1 µm. In some embodiments, the calcium-silicate-hydrate particles of the present disclosure include diameters of at least 5 µm. In some embodiments, the calcium-silicate-hydrate particles of the present disclosure include diameters that range from less than 100 nm to at least 5 µm. In some embodiments, the calcium-silicate-hydrate particles of the present disclosure include diameters that range from less than 250 nm to at least 1 µm.

The calcium-silicate-hydrate particles of the present disclosure may also be in the form of various structures and forms. For instance, in some embodiments, the calcium-silicate-hydrate particles of the present disclosure are in the form of nanoparticles, microparticles, and combinations thereof. In some embodiments, the calcium-silicate-hydrate particles of the present disclosure are in crystalline form. In some embodiments, the calcium-silicate-hydrate particles of the present disclosure are in semi-crystalline form.

Calcium-Silicate Hydrate Particle Patterns

The calcium-silicate-hydrate particles of the present disclosure can be in the form of various patterns. In some embodiments, the calcium-silicate-hydrate particles of the present disclosure are in the form of self-assembled particles. In some embodiments, the self-assembled particles are non-porous. In some embodiments, the self-assembled particles are substantially non-porous. In some embodiments, the self-assembled particles contain minimal porosity, especially when compared to an assembly of spherical calcium-silicate-hydrate particles or a distribution of calcium-silicate-hydrate particles. In some embodiments, the self-assembled particles are stacked. In some embodiments, the self-assembled particles include surfactants between the particles.

In some embodiments, the self-assembled particles comprise one or more shapes, as described previously. In some embodiments, the shapes are controllable by the methods described previously. In some embodiments, the shapes include, without limitation, cubic shapes, spherical shapes, rod-like shapes, rhombohedra shapes, shell-like shapes, dendritic shapes, agglomerated dendritic shapes, and combinations thereof.

In some embodiments, the calcium-silicate-hydrate particles of the present disclosure are in the form of self-assembled clusters. In some embodiments, the particles in the self-assembled clusters may have various shapes. In some embodiments, the shapes include, without limitation, cubic shapes, spherical shapes, rod-like shapes, rhombohedra shapes, shell-like shapes, dendritic shapes, agglomerated dendritic shapes, and combinations thereof.

In more specific embodiments, the formed calcium-silicate-hydrate particles are in the form of self-assembled cubic or rod-shaped particles. In some embodiments, the cubic or rod-shaped particles form a patterned architecture. In some embodiments, the patterned architecture resembles a brick and mortar architecture.

Advantages

The methods and compositions of the present disclosure provide various advantages. For instance, as set forth in the images in FIG. 2, the methods and compositions of the present disclosure provide for the first time cubic, rod-shape, and rectangular calcium-silicate-hydrate particles that can be formed in a shape-controlled manner. Moreover, the calcium-silicate-hydrate particles of the present disclosure can self-assemble to achieve a very compact microstructure of cement hydrate with almost zero porosity. Such aspects of the present disclosure provide advantages over packing of distribution of spherical nanoparticles or random colloidal networks in conventional synthesis of cement hydrates.

Furthermore, Applicants' approach provides a simple and environmental friendly procedure of making calcium-silicate-hydrate particles by using sonochemical techniques and affordable starting materials. Such sonochemical techniques are advantageous alternatives to conventional chemical methods. For instance, ultrasound-enabled reactions promote and accelerate a range of homogeneous chemical reactions that can be used to control the shape and morphology of the formed calcium-silicate-hydrate particles. For instance, the shape and morphology of calcium-silicate-hydrate particles can be controlled in some embodiments by using a sonication bath (or tip) and a cationic surfactant.

As such, the methods of the present disclosure can be used to prepare various types of self-assembled calcium-silicate-hydrate particles for use as cementitious materials with significantly improved packing fractions, mechanical properties, durability and minimal porosities.

ADDITIONAL EMBODIMENTS

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1

Preparation of Calcium Silicate Hydrate Particles

Samples with different stoichiometric ratios of calcium source over silicate source (C/S ratios) were prepared using stoichiometric amounts of calcium and silicate sources. The C/S ratios included 1.0, 1.2, 1.5, 1.7, and 2.0.

Detailed steps are provided herein for the preparation of samples with a C/S ratio of 1.5. First, 0.1 mmol of surfactant is dissolved in a 50 mL silicate solution (e.g. 0.5 mmol) to form a homogeneous solution. Next, the mixed solution is transferred to a commercial ultrasonic bath for sonication for a certain amount of time (e.g. 20 min). Thereafter, 0.75 mmol of calcium salt powder is added into the mixture while the solution is continuously sonicated until the powders are completely converted to calcium-silicate hydrate (CSH) particles. The CSH particles in this Example precipitate from solution upon formation. Finally, the precipitates are collected by centrifuging several times (e.g. each time 5 min at 5000 rpm) with deionized water and ethanol, respectively. The CSH particles are then characterized via a wide range of characterization techniques. Various aspects of this method are illustrated in more detail in Example 2.

Example 2

Synthesis of Cubic Calcium Silicate Hydrate Particles at Room Temperature by Sonochemical Methods The feasibility of preparing CSH particles using the surfactant-assisted sonochemical method is investigated in this Example. The effect of C/S ratio, calcium salts, solvent and surfactant are also considered in this Example.

In particular, Applicants show in this Example that the reaction of calcium nitrate with sodium silicate in the presence of cationic surfactants results in formation of CSH particles, which precipitate by adding calcium salt to the mixture of silicate and surfactant. The cube like morphology of the CHS particles has been confirmed by scanning electron microscopy. The study of the reaction of calcium and silicate salts in the presence of surfactants by changing C/S ratio and solvent amount produced other morphologies, such as spherical, rhombohedra and agglomerated dendritic particles. The unwanted product in all reactions is calcite, which is the product of carbon dioxide and calcium. Direct diffusion of $CO_2$ in the reaction leads to only calcite phase, which means carbon dioxide can be an inhibitor for the CSH reaction. The synthesized powders were characterized by powder X-ray diffraction (PXRD), FT-IR, X-ray photoelectron spectroscopy (XPS), field emission scanning electron microscopy (FESEM) analysis and transmission electron microscopy (TEM).

In this Example, Applicants also demonstrate how a reaction system can be controlled to produce CSH particles of cubic shape. Initially, the effect of calcium salt on morphology and crystallite sizes of the obtained powders was analyzed. Next, the effect of C/S ratios, solvent amount, co-precipitating of calcium carbonate, and varying the solvent system was studied.

Example 2.1

Materials

Sodium metasilicate pentahydrate (99%) was bought from Strem chemicals. Cetyltrimethylammonium bromide (CTAB) (95%) and Calcium hydroxide were obtained from Sigma-Aldrich. Dodecyl sulfate sodium salt (SDS) (99%) was bought from Fischer Scientific. Tetra(decyl)ammonium Bromide (TKA) (>98%) was purchased from Fischer Scientific. All the chemicals were used without further purification.

Example 2.2

Characterization Details

Powder X-ray diffraction (PXRD) data were obtained with a Rigaku D/Max-2100PC powder diffractometer using unfiltered Cu K$\alpha$ radiation ($\lambda$=1.5406 Å) at 40 kV and 40 mA and a step size of 0.02°. The contribution from $K_{\alpha 2}$ radiation was removed using the Rachinger algorithm. Goniometer alignment was performed regularly with the use of a $SiO_2$ reference standard. Post-acquisition PXRD data processing was carried out using MDI's Jade 9.0.

Powder diffraction files (PDF) from the International Centre for Diffraction Data (ICDD) were used as references for phase identification. FT-Infrared data were recorded on a Perkin Elmer spectrum two spectrophotometer using attenuated total reflectance. Transmission electron microscopy (TEM) experiments were performed by depositing a drop of suspension diluted in hexane on a carbon coated copper grid. The solvent was evaporated and the sample was analyzed using JEOL 2000FX and JEOL 2010 microscopes. Scanning electron microscope (SEM) experiments on samples created by depositing a drop of diluted EtOH suspension of sample on an silicon wafer. The solvent was evaporated, and the stub was coated with a thin layer of gold in a CRC-150 sputter coater.

Example 2.3

Synthesis of Calcium Silicate Hydrate

Samples with C/S ratios of 1.00, 1.50, and 2.0 were prepared using stoichiometric amounts of $Ca(NO)_3.4H_2O$ and Sodium metasilicate pentahydrate. First, 0.036 g of CTAB was dissolved in a 100 mL $Na_2SiO_3.5H_2O$ aqueous solution (0.05 M) to form a homogeneous solution. Next, the mixed solution was transferred to a commercial ultrasonic cleaning bath (40 kHz, 130 W, Branson, 3510) to sonicate for 20 min. Then, $Ca(NO_3)_2.4H_2O$ powders were gradually added into the beaker while the solution was continuously sonicated for 2 h until the powders were completely converted to CSH. As the reaction proceeded, white precipitates occurred in the solution. The precipitates were collected by centrifuging with deionized water (3×40 mL), ethanol (2×20 mL) and acetone (2×20 mL), respectively.

Example 2.4

Synthesis of Calcium Silicate Hydrates Under Different Conditions

CSH samples with a C/S ratio of 2.0 was prepared using stoichiometric amounts of $Ca(NO)_3.4H_2O$ or $Ca(OH)_2$ and sodium metasilicate pentahydrate. First, 0.1 mmol of CTAB, TKA or SDS was dissolved in a solution of $Na_2SiO_3.5H_2O$ (0.5 mmol, 0.1 g) in water (50, 100 and 200 mL) or a mixture of 50 mL water with 50 mL of organic solvents (EtOH, MeCN or acetone) to form a homogeneous solution. Next, the mixed solution was transferred to a commercial ultrasonic cleaning bath (40 kHz, 130 W, Branson, 3510) to sonicate for 20 min. Then, 1 mmol of calcium salt was gradually added into the beaker while the solution was continuously sonicated for 2 h until the powders were completely converted to CSH. As the reaction proceeded, white precipitates formed in the solution. The precipitates were collected by centrifuging with deionized water (3×40 mL), ethanol (2×20 mL) and acetone (2×20 mL) respectively.

Example 2.5

Experimental Results and Discussion

Applicants' attempts to prepare calcium silicate hydrate (CSH) particles using sonication-based methods began with the selection of a calcium source candidate. A search of the relevant literature revealed that Zhang and Chang [16] had previously reported the sono-synthesis of hollow calcium silicate hydrate microspheres using CTAB as a surfactant. [16] However, morphologies have not been well investigated, especially when they used calcium nitrate. Revisiting this reaction using various reaction conditions led to considerably different results.

In particular, Applicants have explored the viability of obtaining the desired compounds by a sonochemical-assisted reaction, using CTAB as a surfactant, from the reaction of sodium metasilicate pentahydrate, with calcium nitrate tetrahydrate/calcium hydroxide in water. As shown in FIGS. 3A-B, while putting the reaction in air and using $Ca(NO_3)_2.4H_2O$, the reactions produced well shaped nano-/micro-particles of CSH nanosheets with cubic structures. However, the particles obtained under Argon were smaller and did not have well cubic morphology. As shown in FIG. 3C, the particle shape changed when the reaction was performed in the presence of calcium hydroxide.

The XRD patterns of the products are shown in FIG. 4, which coincided with the CSH phase (ICDD PDF #002-7218). All the diffraction lines in FIGS. 4A-B are assigned well to the $Ca_{1.5}SiO_{3.5}.xH_2O$ phase. On the other hand, the shape of the low background in the XRD pattern also indicates that some residual calcium carbonate components exist as an amorphous structure (FIGS. 4A and 4C).

PXRD analysis of the product synthesized from $Ca(OH)_2$ showed what appeared to be a CSH material, albeit the shape of the strong diffractions peaks indicates that samples are fairly well crystallized and most likely attributed to bigger particles (FIG. 4C).

FIG. 5 illustrates the FTIR spectra of the CSH samples synthesized with different calcium salts. The formation of CSH is indicated by a complex group of bands in the range of 600-1200 $cm^{-1}$. In all samples, the sharp band around 980 $cm^{-1}$ is characteristic for the Si—OH vibration. The group of bands between 670-680 $cm^{-1}$ can be attributed to Si—O—Si bending vibration.[11] Moreover, the characteristic bands for the $CO_3^{2-}$ group occur in the spectrum around 1445 $cm^{-1}$ (asymmetric stretch vibration) and at 880 (out-of-plane bend vibration). Since the experiments were carried out in air, it may not be possible to prevent incorporation of $CO_2$.[11]

Additional experiments were carried out in which the ratio of calcium nitrate to sodium metasilicate (C/S ratio) was changed. In SEM images as shown in FIG. 6, considerable change was observed by adding more calcium nitrate to the solution. When the C/S ratio was 1, the spherical particles were the dominant shapes. However, some cubic particles were seen under the electronic beam. Increasing the C/S ratio led to the formation of more cubic and rectangle cubic shapes.

The impact of carbon dioxide on the progress of this reaction was also studied. The bubbling of $CO_2$ into the reaction solution under similar conditions leads to lower amounts of precipitates. Powder XRD pattern shows there was no CSH phase in the powder. The only phases in this solid were amorphous silica and calcite, which means carbon dioxide decreases the rate of CSH reaction and performs as an inhibitor for it.

After considering the results of the sono-synthesized CSH by changing the C/S ratio, Applicants also considered other effective parameters which possibly affect the particle shape. One of these variables considered was the relative amount of solvent required for a reaction.

The use of calcium and silicate sources at a C/S ratio of 2.0 led to the formation of cubes in the previous experiment with solvent amounts that were 50 ml and 200 mL. Surprisingly, this change caused a significant change in the yield of the product. After half an hour, the reaction with 50 mL of solvent produced twice the amount of CSH when compared to the second reaction that had 100 mL of water. While these two reactions seemed to be completed after 2 h, the third reaction had no product in these periods of time. The results are summarized in FIG. 8.

As reported before, increasing the time of sonication can be effective in the growth of crystallinity and the increase of CSH yield. The reaction of calcium nitrate and sodium metasilicate was held in the sonication bath and sonicated for more than 4 h to produce CSH particles after that time.

FIG. 8 shows the SEM images of three CSH samples prepared in the presence of different volumes of water. As shown in FIG. 8A, the major particle shapes are cubic and rhombohedra. For the other samples shown in FIG. 8B, the self-assembly of particles to dendritic shapes were obtained.

FIG. 9A shows the TEM images of the cubic particles. In higher magnifications, some other particles appeared with different shapes, such as triangle and rhombohedra. However, the particle had Si, Na and Cl in their structures. This means that these structures are the result of sodium silicate reformation (FIGS. 9B-9C).

In order to study the effect of solvents and surfactants on the shape of the formed CSHs, the reactions were performed in the presence of several surfactants and solvents. The results are summarized in FIG. 10. The reactions of calcium nitrate and sodium metasilicate assisted with CTAB, TKA or SDS were applied in the mixture of water, MeCN, EtOH or acetone. In the presence of CTAB, the major shape of particles was cubic. However, the use of MeCN as a co-solvent led to rectangular cubes. TKA produced cubic particles in water. Changing solvent to water/EtOH led to the production of larger particles that were spherical in shape. However, other solvents did not have a major effect on controlling the shape of the CSHs. However, the other solvents produced agglomerated particles. In the case of cationic and anionic surfactants, anionic surfactants such as SDS and sodium oleate in this Example consumed the ca salt and produced calcium salts of surfactants, which inhibited further reaction of silicate and calcium.

Example 2.6

Conclusions

In this Example, Applicants demonstrated that the synthesis of calcium silicate hydrate particles with appropriate quality and different morphologies is successfully performed via ultrasonic irradiation. The following conclusions are drawn: (i) the output data from XRD and FESEM indicated that cube like morphologies have been successfully obtained by using calcium nitrate and sodium silicate in distilled water via ultra sound irradiation (UI); (ii) the results show that the calcium salt and C/S ratio have significant effects on the morphologies of CSHs, which lead to different forms of fiber-like or spherical cubes; (iii) the results confirm that this CSH production method produces CSHs with a range of different morphologies and sizes in a simple and cost effective manner with minimal preparation time.

Example 3

Shape-Controlled Cement Hydrate Synthesis and Self-Assembly

In this Example, Applicants characterize the attributes of a CSH gel as a model system and propose a method for nucleation and overgrowth of CSH on in-situ formed calcium carbonate seeds, leading to the formation of larger semi-crystalline CSH based cubes. Based on various microscopic and spectroscopic analyses, results show that the choice of calcium salt, precursor concentrations, surfactant, calcium to silicon ratio (C/S) and their combination, has a significant impact on particle growth and morphology.

Moreover, variation of these parameters enables a systematic control over the size and morphology of particles among cubic, rectangular prism, rhombohedra, dendritic, and core-shell-like, which are expressed in a morphology diagram. CSH particles obtained at low C/S ratio show mostly spherical and ill-defined cubic shape, whereas increasing C/S ratio generated CSH particles with well-shaped cubes and rectangular prisms. Further increase of C/S ratio induced the formation of larger particle sizes.

Applicants found that, unlike the anionic surfactants that protect and hinder the reaction of $Ca^{2+}$ with $CO_3^{2-}$ to form the initial seeds, cationic surfactants considerably guide the formation and uniform growth of well-defined particles. The nanoparticle aggregation formation mechanism was suggested based on CSH overgrowth on the calcium carbonate seeds to explain the morphogenesis.

As such, this Example provide a more comprehensive study with controlled reaction system parameters which guide the CSH particles growth and morphogenesis. In what follows, Applicants demonstrate the synthesis of the CSH particles with different morphology and propose the possibility of calcium carbonate seed in-situ generation as a side-product that imparts the seed-mediated growth of shape-controlled CSH particles. Moreover, the sensitivity of the CSH particles shape to the overall concentration of precursors provides an opportunity to self-assemble CSH particles into dendritic microstructures. Applicants have also examined the effect of C/S, precursors concentration, varying the surfactant system and calcium salt counter ion on morphology and size of the obtained particles.

Applicants' previous work on the metal oxide systems showed that the amount of capping agent, solvent and metal ratio, had a significant effect on the shapes of the resulting nanoparticles (NPs). Applicants started the systematic work for the CSH system using 100 mL water as solvent, 0.03 g cetyl trimethylammonium bromide (CTAB), and C/S of 1.5 (0.75 mmol of the calcium salt and 0.5 mmol of sodium metasilicatepentahydrate). Monitoring the UV-Vis absorbance of a CSH solution with time shows that the reaction is fast in the first 25 minutes and after 1 hour negligible reaction was observed (FIG. 11). To ensure that the reaction is complete, the samples were sonicated for an additional 90 minutes after the commencement of precipitation. Then, the as-synthesized product was characterized by using a variety of microscopic and spectroscopic techniques, including scanning electron microscopy (SEM), transmission electron microscopy (TEM), selected area electron diffraction (SAED), energy dispersive X-ray spectrometry (EDAX), solid state Magic Angle Spectroscopy ($^{29}Si$ MAS NMR), thermo gravimetric analysis (TGA) and X-ray diffraction (XRD) (FIG. 12).

FIGS. 12A-H show the SEM image, EDAX based elemental mapping of cubic particles, TEM and lattice resolved high magnification high resolution transmission electron microscopy (HRTEM) images, and SAED images of the cubic particles obtained from the model reaction described earlier. FIG. 12A shows a large area SEM image of the product of the reaction obtained after the reaction. As can be seen, the sample is composed of particles that are uniform in shape: most of the particles formed have cubical and rhombohedral morphology, with the size of 0.4-0.8 μm, pointing towards shape-controlled reaction.

Although calcite is known to form similar morphologies, the samples were analyzed using EDAX to evaluate the elemental composition and was proved that the resultant structures are not calcite particles. The analysis was done on a single cube and also on the bulk samples. EDAX analysis confirmed that the formed structures are composed mainly of Ca, Si, and O with traces of carbon (bottom inset in FIG. 12A). A rough qualitative analysis obtained from EDAX pointed towards a C/S ratio of 1.2 for the bulk material, a range of C/S from 1.2-1.8 was observed for the cubes. Some of the particles show high wt % of calcium, which should have more calcite phase comparing to CSH.

Note that CSH is known to have different C/S ratios and, although the starting C/S ratio is 1.5, the resulting particles may locally have different C/S ratios leading to locally different layered forms. Nevertheless, all samples analyzed confirmed the presence of silicon, which proves that the formed structures are not calcite, but CSH based structures. The TEM image (FIG. 12E) taken from this sample shows that these particles possess mostly cubic shapes. It shows that the product contains smaller particles which weren't observable in the SEM image. The HRTEM images of the cubic particles mainly demonstrate the presence of two planes with inter-planar distances of 3.0 and 5.2 Å, corresponding to (110) and (101) planes, respectively, of the CSH phase (FIGS. 12G-H). Although the inter-planar distance of 3.0 Å is also present in calcite corresponding to its (104) plane (as reported in the International Centre for Diffraction Data (ICDD) #05-0586), the inter-planar distances of 5.2 Å is clearly a signature of CSH.

The exposure to the electron beam severely damages the samples making the high resolution imaging challenging. After a short exposure to the beam, crystals melt and convert into an amorphous phase (FIGS. 13A-B). Similar instability under the electron beam has been reported previously. CSH crystals have a very limited lifetime under the beam as a result of dehydration, and melt to yield an amorphous product. SAED analysis done on the cubes demonstrates diffuse rings, indicating the presence of poorly crystalline structures of CSH particles melting upon electron beam exposure (FIG. 12F). However, on careful analysis, blunt bright dots corresponding to (110) planes of CSH were also seen, pointing to a largely amorphous structure with small islands of irregularly oriented crystalline grains (as observed in FIG. 12F). Bulk spectroscopic measurements also confirmed the formation of CSH phase. The $^{29}$Si MAS NMR spectra obtained for the CSH particles is shown in FIG. 12I, which contains two peaks at about −79.9 and −85.5 ppm. These peaks correspond to $Q^1$ (end chain silicate tetrahedra) and $Q^2$ (middle chain and bridging silicate tetrahedra), respectively. The peak at −92.1 ppm is related to a mixture of $Q^2$ and $Q^3$. Presence of $Q^2$ at this region can be due to the cyclic $Q^2$ structure or the chemical attachments such as OH⁻ or $Ca^{2+}$. The peaks at the range of −97.1 to −102.0 ppm are assigned to the $Q^3$ which is because of the cross-linking of some of the silicate tetrahedra between the C—S—H sheets. It is reported that the presence of CTAB significantly increases the $Q^2/Q^1$ ratio in CSH structure.

Applicants suggest that not only CTAB is responsible for higher polymerization of CSH, but other stimulants such as sonication and warming of the reaction medium while sonicating can increase polymerization degree. Thus, presence of small amounts of $Q^3$ is the result of all the parameters mentioned above or locally small C/S ratio. This sample was characterized with IR spectroscopy which is a useful tool to study the local structure of solids. In this study, the mid-IR spectrum (frequency range 4000-400 $Cm^{-1}$) was collected for powdered sample.

FIG. 12J illustrates the FT-IR spectra of the synthesized CSH with starting C/S ratio of 1.5. The presence of intense, sharp peak at ~970 $cm^{-1}$ is due to the Si—O stretching vibrations in combination with Si—O—Si bending bands at ~667 $cm^{-1}$ again indicates the formation of CSH structures. The broad groups of peaks in the range of 1420-1480 $cm^{-1}$ are the characteristic bands for the asymmetric stretching of (U3) $CO_3^{2-}$ group, and the weak shoulder at ~870 $cm^{-1}$ is due to the out-of-plane bending (U2) of $CO_3^{2-}$. The band at 1640 $cm^{-1}$ corresponds to H—O—H bending vibration of molecular $H_2O$. The broad band at 2900-3600 $cm^{-1}$ attributes to the stretching vibration of O—H groups in $H_2O$ or hydroxyls with wide range of hydrogen bond strengths. Weak bands are observed at 2867, and 2924 $cm^{-1}$ for the contamination of CTAB in CSH product. The silicate vibration regions of this CSH sample generally resemble the reported spectrum of 1.4 nm tobermorite which has mostly $Q^2$ sites, appears in the range of 900-1060 $cm^{-1}$. However, Applicants observed the presence of $Q^3$ and $Q^1$ sites in the $^{29}$Si MAS NMR of this sample. The Si—O vibrations for these silicate structures at 1200 and 811 $cm^{-1}$ aren't noticeable in the IR spectrum, suggesting that the product contains mostly $Q^2$. XRD analysis also points towards the presence of CSH formation (FIG. 12K).

The XRD pattern verified the product is CSH phase as reported (ICDD, PDF #002-7218). The presence of intense (110) and (200) peaks at 2θ=29.2° and 32.0° and less intense features around 16.9°, 49.8°, and 55.3° corresponding to (101), (020), (310) planes support the formation of CSH particles in the reaction. The sample kept in sonication bath for 2 and 8 hours were analyzed using thermo gravimetric analysis (TGA), as shown in FIG. 12L. The first peak, located between ambient temperature and about 250° C., is associated with the removal of free, adsorbed, and interlayer water. In the both CSH samples, this peak is followed by a broader low intensity peak (240-460° C.) that is possibly due to the removal of constitutional water from the CSH crystal structure, as reported earlier. The weight loss at the range of 550-950° C. indicates the presence of ~2.7 and 6.3 wt % of $CO_2$ in the samples with 2 and 8 hour reaction times, thereby pointing the formation of CSH and only very low percent of carbon in the structure. Without being by theory, it is envisioned that the latter observation could be due to the presence of nanosized calcite seed particles, which helps in the formation of larger CSH particles (as explained in more detail herein).

Example 3.1

Nanoparticle Growth

Nucleation is a desirable step in controlling the formation (precipitation reaction) of particles. Nucleation can influence the whole growth mechanism and consequently can have a direct impact on the final particle shape and size. In this Example, the reaction was done in ambient conditions without restricting the air flow in and out of the reaction vessel. Hence, the mitigation and/or dissolution of $CO_2$ in the solvent (water) were not eliminated. This was illustrated by the decrease in pH of the reaction mixture (from 11.5 to 11.3) in the initial phase of the reaction, representing the dissolution of $CO_2$ and formation of carbonic acid. Hence, in addition to $Ca^{2+}$ and $SiO_3^{2-}$, $CO_3^{2-}$ was also present in the reaction mixture. Without being bound by theory, Applicants hypothesize, based on the free energy of formation and stability, that $Ca^{2+}$ in presence of $CO_3^{2-}$, will prefer to react with $CO_3^{2-}$ rather than $SiO_3^{2-}$. This reaction can result in the formation of calcite nanoparticles (NPs). These nanoparticles can be easily stabilized by CTAB present in the ensemble. Since the concentration of $CO_3^{2-}$ is small (dissolution from the air is the only source), they might get used-up fast and the remaining calcium ions are forced to react with $SiO_3^{2-}$ leading to the formation of CSH phases.

However, the presence of calcite NPs could catalyze CSH nucleation by acting as the seed particles with the CSH phases nucleating on their surface. Synthesis of calcite nano-rhombohedra/cubic seed particles in the presence of surfactant/additives was already literature reported. The key factor to the ordered organization of rhombohedral building units in this pathway is the physical diffusion limitation in gels.

Without being bound theory, Applicants propose a similar reaction as illustrated in FIG. 14. As illustrated in FIG. 14, dissolved $CO_2$ in the reaction mixture would compete with silicate anions producing amorphous calcite. CTAB may stabilize these seeds as cubic/rhombohedra NPs via an oriented growth mechanism along the (104) face. After the initial reaction, the concentration of $CO_3^{2-}$ drastically diminishes, and the reaction between $Ca^{2+}$ and $SiO_3^{2-}$ proceeds to create CSH.

Since the nucleation process is energetically more favorable on the surface of a seed particle, CSH nucleation happens on the surface of calcite seed NPs. Anisotropic growth of particles on seeds in the presence of CTAB is well documented. Therefore, Applicants propose a semi-epitaxial overgrowth of these seeds to form a larger semi-crystalline CSH based micro cubes (FIG. 14).

To substantiate this mechanism, several control experiments/analyses were done. A reaction was carried out in the presence of excess $CO_2$ (by purging $CO_2$) into the reaction mixture. Only calcite particles along with amorphous silica and no CSH phases were observed (FIG. 15). This is understandable because a continuous supply of $CO_2$ (and the corresponding production of $CO_3^{2-}$) is maintained. Hence, $Ca^{2+}$ preferentially reacts with $CO_3^{2-}$, leading to the formation of calcite and amorphous silica arising from unreacted $SiO_3^{2-}$.

Another control experiment was carried out in an $N_2$ atmosphere to establish the importance of $CO_2$ dissolution and formation of calcite seeds in the reaction. This is an identical reaction to that of the model reaction discussed earlier but performed under an $N_2$ atmosphere where all the ingredients were prepared under $N_2$ to avoid the presence of $CO_2$ as much as possible. The reaction only resulted in the formation of CSH with a crumpled sheet-like morphology (FIG. 16). The above control experiments support Applicants' proposed mechanism and illustrate the importance of $CO_2$, which entail the formation of calcite seed particles in the process. Moreover, Applicants' TGA analysis indicated the presence of a small amount of carbon (2.7 and 6.3% weight loss after 2 hours and 8 hours), which could be plausibly due to the calcite seeds according to Applicants' mechanism (FIGS. 12K and 17).

To accurately probe the important factors that influence the particle morphology and stoichiometry, a series of reactions were designed. By varying certain factors and/or ingredients of the reaction, the size, shape, and stoichiometry of the CSH can be further modified. In what follows, Applicants describe the effects of i) variation in C/S ratio, ii) precursor concentration, iii) nature of the surfactant (anionic vs cationic), and iv) the counter anion in calcium precursors, on the formed CSH structures.

Example 3.2

Influence of the Ca to Si Ratio

The effect of changing the C/S ratio on the morphology of the CSH cubes was examined by varying the concentration of calcium precursor while keeping the sodium silicate pentahydrate amount constant (at 0.5 mmol). All other conditions were unchanged as in the parent process (0.03 g of CTAB in 100 mL water and growth time of 90 min in the sonication bath). The SEM, EDAX, Si MAS NMR, and XRD data for the products are shown in FIG. 18. Applicants found that at lower C/S ratios (C/S=1), more spherical nanoparticles and cubes with smaller dimensions are formed, while increasing the C/S ratio to 2.0, scaffolded spherical embryos contoured with the larger cubic shape resulted.

In general, the size and yield of cubic particles increased with increasing calcium content in the reaction. Without being bound by theory, this can be because a larger supply of calcium results in more Ca availability for seeds nucleation and CSH overgrowth. In other words, reducing the C/S ratio restricts the increase in size of the calcite cubical seeds and reduces the final size of CSH cubes.

FIGS. 18A-B show the SEM images of the products at C/S of 1.0 and 2.0. The elemental analysis indicated the presence of Ca and Si in the CSH products (FIG. 18C). To evaluate the C/S ratio, quantitative analysis was done using the EDAX spectra. The C/S ratio was determined to be 0.82, 1.72 for CSH samples which had starting C/S ratio of 1.0 and 2.0, respectively. Without being bound by theory, two possible reasons for slightly lower C/S ratios in the final products can be: i) the reaction process lead to $Ca^{2+}$ leaching; and ii) the presence of the amorphous silica in silicate substrate.

The EDAX spectra also show other elements such as C and Na that arise either from the carbon tape or as impurities from the reaction solution or calcium carbonate. XRD patterns obtained from these products match with the CSH phase, (ICDD, PDF #002-7218). Intense peaks attributed to (110) and (200) planes at $2\theta=29.2°$ and $32.0°$ and less intense features around $16.9°$, $49.8°$, and $55.3°$ corresponding to (101), (020), (310) planes are present in the XRD pattern of products, supporting the formation of CSH (FIG. 18D). For all these samples, the XRD patterns showed the CSH phase and less intense peaks of calcium carbonate.

The deconvolution of $^{29}Si$ MAS NMR of the spectrum for the low C/S ratio CSH system (C/S=1.0) suggests that in addition to the relatively small $Q^1$ peak at $-79.9$ ppm, four other peaks exist having more negative chemical shift values (FIG. 18E). These peaks, which appear at $-86.8$, $-91.3$, $-97.0$, and $-107.4$ ppm, are attributed to $Q^2$, mixture of $Q^2$ and $Q^3$, and $Q^3$. The spectrum of high C/S ratio CSH (C/S=2.0) mainly contains $Q^1$ and $Q^2$ peaks at about $-78.8$ and $-84.3$ ppm (FIG. 18F). The peak at $-91.2$ ppm is assigned to the mixture of $Q^2$ and $Q^3$. Intensity of this peak is lower for the sample with C/S of 2.0 due to the higher quantity of calcium which inhibits silicate chain cross-linking.

Example 3.3

Comparative Morphogenesis by Varying Precursor Concentration

The effect of precursor concentrations was induced in the synthesis ensemble by varying the amount (volume) of water (25, 50, and 200) introduced into the reaction using different Ca to Si ratio of 1.0, 1.5 and 2.0 (FIG. 19). The variation in precursor concentration resulted in significant changes in the yield of products and duration of the reaction. Samples containing 25 and 50 mL that were comparatively more concentrated resulted in almost double the amount of CSH in the first 30 to 60 minutes of the reaction (monitored by UV-Vis), compared to the reaction with lower precursor concentration (200 mL water). Moreover, while the reaction from concentrated starting precursors seemed complete after 90 minutes, the reaction involving 200 mL of water had only a finite amount of product in the same period of time.

As reported before, increasing the time of sonication can be effective in growth of crystalline phases and increasing the yield of the reaction. Thus, the latter reaction (with 200 mL of water) was placed in the sonication bath for an additional 4 hours to obtain the final product. At all Ca to Si ratio, an abrupt transition in morphology was observed with increasing solvent volume from 100 to 200 mL. In contrast to the cubic shape of CSH particles obtained at 25-100 mL (FIGS. 19A-F, 12A and 18A-B), large core/shell-like at C/S of 1.0 (FIG. 19G) and dendritic assembled shaped particles at C/S of 1.5 and 2.0 (FIGS. 19H-I) were observed. The XRD pattern (FIG. 17) confirmed the assignment of the product to a CSH phase in all samples.

However, XRD patterns of samples synthesized in dilute solution show higher concentration of calcite due to longer reaction time and higher volume of solvent which stimulate the higher dissolution of carbonate anion (FIGS. 19G-I). Additional peaks related to portlandite are also observed in the XRD pattern of CSH at 200 mL of water and C/S ratio of 1.5 and 2.0. Although the dendritic shape in FIGS. 19H-I do not show well-ordered shape of subunits, it is apparent from SEM image of samples with C/S of 1.5 and 2.0 using 200 mL solvent at higher magnification that some of the exposed tails and edges are assembled from oriented cubic subunits (inset in FIG. 19H).

As illustrated in FIG. 19, while the morphology of particles in the presence of 25 and 50 mL water are cubic and rhombohedra (FIGS. 19A-F), diluting the solution with 200 mL of water leads to slower precipitation from solution and dendritic structures (FIGS. 19H-I). Without being bound by theory, Applicants believe that the slower reaction kinetics at diluted solutions might facilitate the self-assembly of smaller CSH nuclei into dendritic structures as reported for other materials. Furthermore, Applicants believe that heterogeneous nucleation of calcite can affect the growth mechanism.

The noticeable difference in these reactions are keeping sample under supersaturation and in the sonication bath for longer reaction time, which increases the average temperature of solution. Both temperature and concentration gradient (at a particular precursor concentration) arises the controlled diffusion of CSH particles. The oriented attachment of particles starts with a seed particle formed by nucleation under supersaturation and the growth of dendrites proceeds from this seed particle, by the sticking and stacking of the diffusing particles at certain favorable sites. On the other hand, reaction temperature affects the morphology, polymorph and size of seed particles. Some studies showed that $CaCO_3$ concentration had a strong influence on the shape of crystals at different temperatures. The direct observation of nanoparticles in some samples as seeds and intermediates by SEM is helpful for providing structural insight into the growth of CSH particles. Indeed, the product structure and morphology has a significant dependence on both variables which control the precursors concentration, C/S ratio and volume of solvent. Particles size is also triggered by varying precursors concentration. Generally larger particles were obtained by increasing the concentration of precursors. Some particles with multiple twinned structures or ill-defined structures can also be found in the product synthesized in higher concentration of precursors (volume of water of 25 and 50 mL).

Example 3.4

Cationic Versus Anionic Surfactants

The importance of surfactants in the size- and/or shape-controlled synthesis of nanostructures has been observed. Here, to address the question about the role of surfactant in controlling the morphogenesis process, the effect of three cationic and one anionic surfactants on the shape of the CSH products was explored (FIG. 20). Cationic surfactants namely CTAB, cethylpyridinium bromide (CPB), tetra(decyl)ammonium Bromide (TDAB), and an anionic surfactant dodecyl sulfate sodium salt (SDS) were examined in the reaction. In the presence of CTAB and CPB, the major shapes of particles were cubic, whereas TDAB produced cubic nanoparticles, rectangular prisms, and rods. However, the poor solubility of the surfactants in water caused them to remain in the CSH matrix.

Comparing cationic and anionic surfactants in Applicants' experiments, SDS does not appear to be appropriate surfactants for this method, yielding highly aggregated irregular structures. On the other hand, under experimental conditions for C/S=2 and using calcium nitrate and sodium silicate with no added CTAB under stirring, there was no specific shape for the products (FIG. 21A). The use of sonication leads only to irregular structures with severe agglomeration (FIG. 21B). Addition of surfactants resulted in well-defined cubic CSH particles (FIG. 20A).

Without being bound by theory, Applicants propose that the interaction of cationic surfactants with a silicate source and/or carbonate anion and their subsequent stabilization (which render the resultant structures) are the key reasons for the formation of well-defined structures. Anionic surfactants on the other hand could protect $Ca^{2+}$, and hinder their reaction with $CO_3^{2-}$, thereby restricting the possibility of calcite seeds and the formation CSH micro-cubes.

Example 3.5

Particle Formation by Varying Counter Ions in the Calcium Precursor

Anions are known to intimately modulate the final shape of nanoparticles in surfactant mediated synthesis. As discussed earlier, in the presence of $NO_3^-$, well-defined CSH nano/micro-particles with cubic/rhombohedral morphology were obtained. By examining other anions including $Cl^-$ ($CaCl_2$) and hydroxide, $Ca(OH)_2$, the morphology of the resulting CSH structures was completely different (FIG. 22). Both samples were analyzed using SEM and EDAX extensively, which confirmed that the formed structures are mainly composed of Ca, Si, and O with traces of carbon where the latter is from calcite structures or from adsorbed carbon species, which cannot be avoided.

When $CaCl_2$ is used as the calcium source, the formed particle did not exhibit any particular preference for any shape and showed differently sized and/or shaped CSH structures with a severe aggregation (FIG. 22A). However, the reaction carried out using calcium hydroxide as the calcium source caused the particles to form sheet-like fluffy material (FIG. 22B). Both of these structures showed characteristic XRD patterns and IR peaks pointing towards the presence of CSH phase. XRD patterns for these reactions are shown in FIG. 22C, which match with the CSH phase (ICDD, PDF #002-7218). On careful examination, for the product synthesized from $Ca(OH)_2$, Applicants can observe less intense features around $2\theta=23.04°$, $29.3°$, $39.40°$, $47.48°$ and $48.49°$, due to the presence of calcite. The narrowness of peak at $29.3°$ reflects the higher formation of crystalline calcite phase in the sample due to higher affinity of calcium hydroxide to react with carbon dioxide. This feature also resemble to the larger particles effect on sharpening of the XRD peaks. The FT-IR spectra of samples synthesized in the presence of calcium hydroxide and calcium chloride is shown in FIG. 22D.

All samples have a complex group of bands in at ~960 $cm^{-1}$, corresponding to the asymmetric and symmetric stretching vibrations of Si—O bonds, and a band at ~660 $cm^{-1}$ due to Si—O—Si bending vibrations. The bands in the range of 1400-1500 $cm^{-1}$ corresponding to the asymmetric stretching of $CO_3^{2-}$, and the weak shoulder at ~870 $cm^{-1}$ due to the out-of-plane bending of $CO_3^{2-}$. $CO_3^{2-}$ peaks have higher intensity for the CSH sample formed from calcium hydroxide. This observation is fully consistent with the results obtained from XRD patterns that incorporation of $CO_2$ in the sample synthesized from calcium hydroxide is higher than other CSH products from other calcium precursors. The band at 1640 and in the region of 2600-3600 cm$^{-1}$ are also due to H—O—H bending vibration of molecular H$_2$O and stretching vibrations of O—H groups.

In sum, Applicants demonstrated in this Example a shape-controlled synthesis of complex semi-crystalline Calcium-silicate-hydrate (CSH) with a variety of particle morphologies and sizes via a seed in-situ generation and a seed-mediated growth protocol. Due to the regulated reaction kinetics and crystal growth of CSH, the product morphology was controlled to obtain 1) spheres resulting from the growth on amorphous spherical seeds of calcite; 2) cubes grown on the rhombohedra initial particles of calcite; 3) core/shell-like resulting from decreasing the precursors concentration and C/S to 1.0 and 4) a self-assembled dendritic form as a result of diluting the solution twice at C/S of 1.5 or 2.0.

For a given solvent volume, Applicants' results show that the C/S ratio should desirably be larger than 1.0 to achieve the formation of cube-like CSH structures. Equally important, Applicants demonstrated that cationic surfactants play multiple roles in particle formation, including: 1) the formation of cubic calcite seeds in the initial stage; and 2) control of the uniform growth of CSH particles. Decreasing the amount of water was shown to be decisive in speeding up the growth rate and increasing the size of cubic-shaped particles. As shown in FIG. 23, Applicants categorize the as-obtained CSH microstructures in the morphology diagram into three classes according to their morphological features: crystals with cubic, core/shell-like and dendritic shapes.

Example 3.6

Materials

Sodium metasilicatepentahydrate (99%) was bought from Strem Chemicals. CTAB (95%), CPB and calcium hydroxide were obtained from Sigma-Aldrich. SDS (99%) was acquired from Fischer Scientific. Tetradecylammoniumbromide (TDAB) (>98%) was purchased from Fischer Scientific. All the chemicals were used as received without further purification.

Example 3.7

Synthesis Methods

CSH samples with C/S ratios of 1.0, 1.5, and 2.0 were prepared using stoichiometric amounts of Ca(NO$_3$)$_3$.4H$_2$O and sodium metasilicate pentahydrate. For example, for the model reaction of CSH with C/S=1.5 and CTAB, first 0.03 g of CTAB was dissolved in a 100 mL Na$_2$SiO$_3$.5H$_2$O aqueous solution (0.05 M) to form a homogeneous solution. The resulting solution was transferred to a commercial ultrasonic cleaning bath (40 kHz, 130 W, Branson, 3510) and sonicated for 20 minutes. Subsequently, Ca(NO$_3$)$_2$.4H$_2$O powder was gradually added into the beaker while the solution was continuously sonicated for 100 minutes until the powders were completely converted to CSH. As the reaction proceeded, a white precipitate formed. The precipitate was collected by centrifuging with 2 mM calcium hydroxide (CH) solution (3×20 mL) and ethanol (2×10 mL) respectively. Other controlled reactions followed a similar procedure except that the stoichiometry of raw materials (C/S ratio of 1 and 2), surfactant (CPB, TDAB or SDS), calcium salt (Ca(OH)$_2$, CaCl$_2$) and water volume (25, 50 and 200 mL) were different.

Example 3.8

Characterizations

Powder X-ray diffraction (XRD) data were obtained with a Rigaku D/Max-2100 PC powder diffractometer using unfiltered Cu Kα radiation (λ=1.5406 Å) at 40 kV and 40 mA and a step size of 0.02°. The contribution from K$_{\alpha 2}$ radiation was removed using the Rachinger algorithm. Goniometer alignment was performed regularly with the use of a SiO$_2$ reference standard. Post-acquisition XRD data processing was carried out using MDI's Jade 2010. Powder diffraction files (PDF) from the ICDD were used as references for phase identification. Fourier transform infrared spectroscopy (FT-IR) data were recorded on a Perkin Elmer spectrum with two spectrophotometers using attenuated total reflectance. Transmission electron microscopy (TEM) experiments were performed by depositing a drop of a suspension of the nanoparticles diluted in EtOH onto a carbon-coated copper grid. The solvent was evaporated and the sample was analyzed using a JEOL 2100 Field Emission Gun Transmission Electron Microscope. Scanning electron microscopy (SEM) experiments on samples were created by depositing a drop of diluted EtOH suspension of sample on an aluminum stub or a silicon wafer or glass slides. The solvent was evaporated, and the stub was coated with a thin layer of gold in a CRC-150 sputter coater in the case of using glass. Energy dispersive X-ray spectroscopy (EDAX) analyses were carried out on a JEOL FEI Quanta 400 ESEM FEG on CSH particles. Measurements were performed at 20 kV and with a measured beam current of 1 nA. The aluminum stub covered with carbon tape was used for elemental analysis of samples. Solid state Magic Angle spectra ($^{29}$Si MAS NMR) were collected on a Bruker Advance 200 spectrometer at 39.76 MHz. Samples were measured using a 7 mm extended VT MAS probe with 7 mm long barrel ZrO$_2$ rotors and plugs and Kel-F fluoropolymer caps. Chemical shifts were referenced to hexamethylcyclotrisiloxane (δ) −9.66 ppm by sample replacement. All spectra were collected at a magic angle spinning speed of 6.00 kHz without high-power $^1$H decoupling. Spectra were acquired using a 90° $^{29}$Si pulse of 5.75 μs and a spectral width of 14750 Hz. Data were collected and analyzed with TopSpin v1.3 and Dmfit2011. Thermal analyses on powder samples (~3 mg) were carried out using a Q-600 Simultaneous TGA/DSC from TA Instruments at 20° C. min$^{-1}$ from room temperature (RT) to 1000° C. under Argon atmosphere using a flowing rate 60 mL min$^{-1}$.

Example 3.9

Comparison of Absorption Spectra of Calcium Nitrate and Sodium Silicate

In FIG. 11, the absorption spectra of Calcium nitrate and sodium silicate before and after mixing in water are compared. The absorption was measured during the first 65 minutes of reaction more than ten times. The graph shows that after adding calcium solution to silicate, the intensity increases after the first few minutes and three new peaks at 210, 270 and 320 appear. After around 25 minutes the changes decrease, demonstrating the main part of reaction takes place at the first 25 minutes of mixing raw materials. Since the sonication power can increase the rate of reaction and in view of the aforementioned UV-Vis results, Applicants used the 60-100 min reaction time for all of the experiments, except in the case of using 200 mL water where the reaction was performed for 6 hours.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A composition comprising calcium-silicate-hydrate particles,
   wherein the calcium-silicate-hydrate particles are self-assembled non-porous or substantially non-porous particles that comprise calcite nanoparticles formed by an interaction of a calcium source and carbonate; and
   calcium-silicate hydrate phases formed on the surface of the calcite nanoparticles when the remaining calcium source reacts with a silicate source, and
   wherein the calcium-silicate-hydrate particles comprise at least one of cubic shapes, rectangular shapes, spherical shapes, rod-like shapes, rhombohedra shapes, core-shell-like shapes, dendritic shapes, agglomerated dendritic shapes, irregular shapes, and combinations thereof.

2. The composition of claim 1, wherein the calcium source is selected from the group consisting of calcium salts, calcium nitrate, calcium carbonate, calcium hydroxide, calcium acetate, calcium chloride, calcium oxide, and combinations thereof.

3. The composition of claim 1, wherein the silicate source is selected from the group consisting of sodium silicates, potassium silicates, silicon oxide, silicon monoxide, silicon dioxide, silicon tetraoxide, silicic acid, sodium metasilicate pentahydrate, and combinations thereof.

4. The composition of claim 1, wherein the calcium-silicate-hydrate particles have cubic shapes.

5. The composition of claim 1, wherein the calcium-silicate-hydrate particles have rectangular shapes.

6. The composition of claim 1, wherein the formed calcium-silicate-hydrate particles are in semi-crystalline form.

7. The composition of claim 1, wherein the formed calcium-silicate-hydrate particles comprise diameters ranging from about 100 nm to about 5 µm.

8. The composition of claim 1, wherein the formed calcium-silicate-hydrate particles comprise diameters ranging from about 250 nm to about 1 µm.

9. The composition of claim 1, wherein the self-assembled particles comprise surfactants between the particles.

* * * * *